United States Patent
Nielsen et al.

(10) Patent No.: US 8,296,308 B2
(45) Date of Patent: Oct. 23, 2012

(54) METHODS AND APPARATUS FOR ASSOCIATING A VIRTUAL WHITE LINE (VWL) IMAGE WITH CORRESPONDING TICKET INFORMATION FOR AN EXCAVATION PROJECT

(75) Inventors: Steven E. Nielsen, North Palm Beach, FL (US); Curtis Chambers, Palm Beach Gardens, FL (US); Jeffrey Farr, Jupiter, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 256 days.

(21) Appl. No.: 12/475,935

(22) Filed: Jun. 1, 2009

(65) Prior Publication Data

US 2010/0205195 A1 Aug. 12, 2010

Related U.S. Application Data

(60) Provisional application No. 61/151,769, filed on Feb. 11, 2009.

(51) Int. Cl.
*G06F 17/30* (2006.01)
(52) U.S. Cl. .................................. 707/758; 382/113
(58) Field of Classification Search .................. None
See application file for complete search history.

(56) References Cited

U.S. PATENT DOCUMENTS

| | | | |
|---|---|---|---|
| 4,550,376 A | 10/1985 | Maciejczak | |
| 5,032,989 A | 7/1991 | Tornetta | |
| 5,414,462 A | 5/1995 | Veatch | |
| 5,519,809 A | 5/1996 | Husseiny et al. | |
| 5,557,515 A * | 9/1996 | Abbruzzese et al. | 705/7.15 |
| 5,699,244 A | 12/1997 | Clark, Jr. et al. | |
| 5,815,411 A | 9/1998 | Ellenby et al. | |
| 5,937,406 A * | 8/1999 | Balabine et al. | 1/1 |
| 5,961,569 A | 10/1999 | Craport et al. | |

(Continued)

FOREIGN PATENT DOCUMENTS

EP 100324 B1 2/1984

(Continued)

OTHER PUBLICATIONS

"Webopedia—What is a Database." Screenshot provided. Available at: http://www.webopedia.com/TERM/D/database.html.*

(Continued)

*Primary Examiner* — Neveen Abel Jalil
*Assistant Examiner* — Daniel Kinsaul
(74) *Attorney, Agent, or Firm* — Foley & Lardner LLP; Joseph Teja, Jr.

(57) ABSTRACT

Methods and apparatus for facilitating detection of a presence or an absence of at least one underground facility within a dig area. Source data representing one or more input images of a geographic area including the dig area is electronically received at a first user location, which may be remote from the dig area. The source data is processed so as to display at least a portion of the input image(s) on a display device. One or more indicators are added to the displayed input image(s), via a user input device associated with the display device, to provide at least one indication of the dig area and thereby generate a marked-up digital image. The marked-up digital image may be electronically bundled with information from a corresponding ticket. A descriptor file may be used to identify one or more marked-up images corresponding to a ticket.

44 Claims, 14 Drawing Sheets

U.S. PATENT DOCUMENTS

| | | | |
|---|---|---|---|
| 5,987,380 A | 11/1999 | Backman et al. | |
| 6,075,481 A | 6/2000 | Eslambolchi et al. | |
| 6,101,087 A | 8/2000 | Sutton et al. | |
| 6,169,517 B1 | 1/2001 | Eslambolchi et al. | |
| 6,195,922 B1 | 3/2001 | Stump | |
| 6,266,432 B1* | 7/2001 | Wiens | 382/113 |
| 6,298,446 B1* | 10/2001 | Schreiber et al. | 726/27 |
| 6,343,290 B1 | 1/2002 | Cossins et al. | |
| 6,401,051 B1 | 6/2002 | Merriam | |
| 6,426,872 B1 | 7/2002 | Sutton et al. | |
| 6,434,258 B2 | 8/2002 | Wiens | |
| 6,445,334 B1 | 9/2002 | Bradley | |
| 6,493,650 B1 | 12/2002 | Rodgers et al. | |
| 6,501,501 B1 | 12/2002 | Miyazawa | |
| 6,587,851 B1 | 7/2003 | Ditcharo et al. | |
| 6,650,293 B1 | 11/2003 | Eslambolchi et al. | |
| 6,710,741 B2 | 3/2004 | Tucker | |
| 6,751,552 B1 | 6/2004 | Minelli | |
| 6,751,553 B2 | 6/2004 | Young et al. | |
| 6,751,554 B1* | 6/2004 | Asher et al. | 702/5 |
| 6,772,142 B1 | 8/2004 | Kelling et al. | |
| 6,798,379 B2 | 9/2004 | Tucker et al. | |
| 6,853,905 B2 | 2/2005 | Barton | |
| 6,895,356 B2 | 5/2005 | Brimhall et al. | |
| 6,898,525 B1 | 5/2005 | Minelli | |
| 6,904,160 B2* | 6/2005 | Burgess | 382/113 |
| 6,904,361 B1 | 6/2005 | Tallman et al. | |
| 6,956,524 B2 | 10/2005 | Tucker et al. | |
| 6,958,690 B1 | 10/2005 | Asher et al. | |
| 6,972,698 B2 | 12/2005 | Deguchi | |
| 6,999,021 B2 | 2/2006 | Taylor, Jr. et al. | |
| 7,003,138 B2 | 2/2006 | Wilson | |
| 7,054,741 B2 | 5/2006 | Harrison et al. | |
| 7,133,802 B2 | 11/2006 | Koch et al. | |
| 7,142,196 B1 | 11/2006 | Connor et al. | |
| 7,171,389 B2 | 1/2007 | Harrison | |
| 7,216,034 B2 | 5/2007 | Vitikainen et al. | |
| 7,262,797 B2 | 8/2007 | Weldum | |
| 7,313,759 B2 | 12/2007 | Sinisi | |
| 7,356,406 B2 | 4/2008 | Harrison et al. | |
| 7,447,509 B2 | 11/2008 | Cossins et al. | |
| 7,482,973 B2 | 1/2009 | Tucker et al. | |
| 7,640,105 B2 | 12/2009 | Nielsen et al. | |
| 7,773,095 B1* | 8/2010 | Badrak et al. | 345/619 |
| 7,978,129 B2 | 7/2011 | Sawyer et al. | |
| 8,045,995 B2 | 10/2011 | King | |
| 2001/0004739 A1* | 6/2001 | Sekiguchi et al. | 707/100 |
| 2002/0078035 A1 | 6/2002 | Frank et al. | |
| 2002/0124177 A1 | 9/2002 | Harper | |
| 2002/0184235 A1 | 12/2002 | Young et al. | |
| 2003/0012411 A1 | 1/2003 | Sjostrom et al. | |
| 2003/0061211 A1 | 3/2003 | Shultz et al. | |
| 2003/0131251 A1* | 7/2003 | Fetkovich | 713/193 |
| 2004/0006425 A1 | 1/2004 | Wood et al. | |
| 2004/0030706 A1 | 2/2004 | Evans | |
| 2004/0110515 A1 | 6/2004 | Blumberg et al. | |
| 2004/0128215 A1 | 7/2004 | Florance | |
| 2004/0146185 A1* | 7/2004 | Blair et al. | 382/113 |
| 2004/0210370 A1 | 10/2004 | Gudat et al. | |
| 2005/0033513 A1 | 2/2005 | Gasbarro | |
| 2005/0038999 A1* | 2/2005 | Pelly | 713/165 |
| 2005/0262109 A1* | 11/2005 | Alexandrescu | 707/100 |
| 2005/0273346 A1 | 12/2005 | Frost | |
| 2006/0026020 A1 | 2/2006 | Waite et al. | |
| 2006/0077095 A1 | 4/2006 | Tucker et al. | |
| 2006/0085133 A1 | 4/2006 | Young et al. | |
| 2006/0085396 A1* | 4/2006 | Evans et al. | 707/3 |
| 2006/0125828 A1 | 6/2006 | Harrison | |
| 2006/0161349 A1 | 7/2006 | Cross et al. | |
| 2006/0200305 A1 | 9/2006 | Sheha et al. | |
| 2006/0208927 A1 | 9/2006 | Poor et al. | |
| 2006/0276985 A1 | 12/2006 | Xu | |
| 2006/0282280 A1* | 12/2006 | Stotz et al. | 705/1 |
| 2006/0285152 A1 | 12/2006 | Skillen | |
| 2007/0112936 A1 | 5/2007 | Harrison | |
| 2007/0143676 A1 | 6/2007 | Chen | |
| 2007/0195011 A1 | 8/2007 | Hatori et al. | |
| 2007/0219722 A1 | 9/2007 | Sawyer et al. | |
| 2007/0223803 A1 | 9/2007 | Shindo | |
| 2007/0226004 A1 | 9/2007 | Harrison | |
| 2008/0013940 A1 | 1/2008 | Jung | |
| 2008/0021863 A1 | 1/2008 | Evans et al. | |
| 2008/0189249 A1* | 8/2008 | Petakov et al. | 707/3 |
| 2008/0228294 A1 | 9/2008 | Nielsen et al. | |
| 2008/0245299 A1 | 10/2008 | Nielsen et al. | |
| 2008/0310721 A1 | 12/2008 | Yang | |
| 2009/0013928 A1 | 1/2009 | Nielsen et al. | |
| 2009/0174768 A1* | 7/2009 | Blackburn et al. | 348/130 |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0241046 A1 | 9/2009 | Nielsen et al. | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0033684 A1 | 2/2010 | Thiebaud | |
| 2010/0084532 A1 | 4/2010 | Nielsen et al. | |
| 2010/0085054 A1 | 4/2010 | Nielsen et al. | |
| 2010/0085185 A1 | 4/2010 | Nielsen et al. | |
| 2010/0085376 A1 | 4/2010 | Nielsen et al. | |
| 2010/0085694 A1 | 4/2010 | Nielsen et al. | |
| 2010/0085701 A1 | 4/2010 | Nielsen et al. | |
| 2010/0086671 A1 | 4/2010 | Nielsen et al. | |
| 2010/0086677 A1 | 4/2010 | Nielsen et al. | |
| 2010/0088031 A1 | 4/2010 | Nielsen et al. | |
| 2010/0088032 A1 | 4/2010 | Nielsen et al. | |
| 2010/0088134 A1 | 4/2010 | Nielsen et al. | |
| 2010/0088135 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0091200 A1 | 4/2010 | Vigouroux | |
| 2010/0094553 A1 | 4/2010 | Nielsen et al. | |
| 2010/0117654 A1 | 5/2010 | Nielsen et al. | |
| 2010/0188088 A1 | 7/2010 | Nielsen et al. | |
| 2010/0188215 A1 | 7/2010 | Nielsen et al. | |
| 2010/0188216 A1 | 7/2010 | Nielsen et al. | |
| 2010/0188245 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0201706 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205554 A1 | 8/2010 | Nielsen et al. | |
| 2010/0205555 A1 | 8/2010 | Nielsen et al. | |
| 2010/0228588 A1 | 9/2010 | Nielsen et al. | |
| 2010/0245086 A1 | 9/2010 | Nielsen et al. | |
| 2010/0247754 A1 | 9/2010 | Nielsen et al. | |

| | | | |
|---|---|---|---|
| 2010/0253511 A1 | 10/2010 | Nielsen et al. | |
| 2010/0253513 A1 | 10/2010 | Nielsen et al. | |
| 2010/0253514 A1 | 10/2010 | Nielsen et al. | |
| 2010/0255182 A1 | 10/2010 | Nielsen et al. | |
| 2010/0256825 A1 | 10/2010 | Nielsen et al. | |
| 2010/0256863 A1 | 10/2010 | Nielsen et al. | |
| 2010/0256912 A1 | 10/2010 | Nielsen et al. | |
| 2010/0256981 A1 | 10/2010 | Nielsen et al. | |
| 2010/0257029 A1 | 10/2010 | Nielsen et al. | |
| 2010/0257477 A1 | 10/2010 | Nielsen et al. | |
| 2010/0259381 A1 | 10/2010 | Nielsen et al. | |
| 2010/0259414 A1 | 10/2010 | Nielsen et al. | |
| 2010/0262470 A1 | 10/2010 | Nielsen et al. | |
| 2010/0262670 A1 | 10/2010 | Nielsen et al. | |
| 2010/0263591 A1 | 10/2010 | Nielsen et al. | |
| 2010/0268786 A1 | 10/2010 | Nielsen et al. | |
| 2010/0285211 A1 | 11/2010 | Nielsen et al. | |
| 2010/0318401 A1 | 12/2010 | Nielsen et al. | |
| 2010/0318402 A1 | 12/2010 | Nielsen et al. | |
| 2010/0318465 A1 | 12/2010 | Nielsen et al. | |
| 2010/0324967 A1 | 12/2010 | Nielsen et al. | |
| 2011/0007076 A1 | 1/2011 | Nielsen et al. | |
| 2011/0020776 A1 | 1/2011 | Nielsen et al. | |
| 2011/0022433 A1 | 1/2011 | Nielsen et al. | |
| 2011/0035245 A1 | 2/2011 | Nielsen et al. | |
| 2011/0035251 A1 | 2/2011 | Nielsen et al. | |
| 2011/0035252 A1 | 2/2011 | Nielsen et al. | |
| 2011/0035260 A1 | 2/2011 | Nielsen et al. | |
| 2011/0035324 A1 | 2/2011 | Nielsen et al. | |
| 2011/0035328 A1 | 2/2011 | Nielsen et al. | |
| 2011/0040589 A1 | 2/2011 | Nielsen et al. | |
| 2011/0040590 A1 | 2/2011 | Nielsen et al. | |
| 2011/0045175 A1 | 2/2011 | Nielsen et al. | |
| 2011/0046993 A1 | 2/2011 | Nielsen et al. | |
| 2011/0046994 A1 | 2/2011 | Nielsen et al. | |
| 2011/0046999 A1 | 2/2011 | Nielsen et al. | |
| 2011/0060496 A1 | 3/2011 | Nielsen et al. | |
| 2011/0060549 A1 | 3/2011 | Nielsen et al. | |
| 2011/0095885 A9 | 4/2011 | Nielsen et al. | |
| 2011/0131081 A1 | 6/2011 | Nielsen et al. | |
| 2011/0135163 A1 | 6/2011 | Nielsen et al. | |
| 2011/0137769 A1 | 6/2011 | Nielsen et al. | |
| 2011/0236588 A1 | 9/2011 | Nielsen et al. | |
| 2011/0279229 A1 | 11/2011 | Nielsen et al. | |
| 2011/0279230 A1 | 11/2011 | Nielsen et al. | |
| 2011/0279476 A1 | 11/2011 | Nielsen et al. | |
| 2011/0282542 A9 | 11/2011 | Nielsen et al. | |
| 2011/0283217 A1 | 11/2011 | Nielsen et al. | |
| 2011/0285749 A1 | 11/2011 | Nielsen et al. | |
| 2012/0019380 A1 | 1/2012 | Nielsen et al. | |
| 2012/0036140 A1 | 2/2012 | Nielsen et al. | |
| 2012/0058751 A1 | 3/2012 | Colley | |
| 2012/0110019 A1 | 5/2012 | Nielsen et al. | |

FOREIGN PATENT DOCUMENTS

| | | | |
|---|---|---|---|
| JP | 2005327228 | | 11/2005 |
| JP | 2006189930 | | 7/2006 |

OTHER PUBLICATIONS

Geographic Information Systems, by Bernhardsen, Tor (2007). Available at: Wiley Online Library.*
Spatial Databases, by Rigaux et al. p. 3, 4. 2002. Screenshots provided. Available at: Google Books.*
"Development of an Underground Utility Damage Prevention Plan (UUDPP) for Company XYZ," by Dockter, Lance. In: The Graduate College, University of Wisconsin-Stout (2008). Available at: http://www2.uwstout.edu/content/lib/thesis/2008/2008dockterl.pdf.*
Virginia Pilot Project, Incorporating GPS Technology to Enhance One-Call Damage Prevention, Phase I—Electronic White Lining Project Report, Nov. 2007, 50 pages.
Blue Stakes of Utah Utility Notification Center, Inc., Association Newsletter, vol. 4, No. 1, pp. 1-8, Nov. 2008.
http://www.a11call.com/rte_proc.html, printed Apr. 14, 2009, 1 page (original publication date unknown).
Alabama 1 Call, GeoRemote, Remote Ticket Entry Manual, 35 pages, printed from website http://www.a11call.com on Apr. 2, 2009 (original publication date unknown).
Alabama 1 Call, Annual Operations Report, 2005, 32 pages, printed from website http://www.a11call.com on Apr. 2, 2009 (original publication date unknown).
Co-Pending U.S. Appl. No. 12/050,555, filed Mar. 18, 2008.
Co-Pending U.S. Appl. No. 12/239,366, filed Sep. 26 2008.
Co-Pending U.S. Appl. No. 12/239,414, filed Sep. 26, 2008.
Co Pending U.S. Appl. No. 12/355,222, filed Jan. 16, 2009.
Co-Pending U.S. Appl. No. 12/355,272, filed Jan. 16, 2009.
Co-Pending U.S. Appl. No. 12/355,300, filed Jan. 16, 2009.
Co-Pending U.S. Appl. No. 12/366,853, filed Feb. 6, 2009.
Co-Pending U.S. Appl. No. 12/475,905, filed Jun. 1, 2009.
Co-Pending U.S. Appl. No. 12/475,924, filed Jun. 1, 2009.
Co-Pending U.S. Appl. No. 12/475,956, filed Jun. 1, 2009.
Co-Pending U.S. Appl. No. 12/422,364, filed Apr. 13, 2009.
Co-Pending U.S. Appl. No. 12/422,372, filed Apr. 13, 2009.
International Search Report and Written Opinion, Application Serial No. PCT/2010/000131, Apr. 23, 2010.
Blue Stakes of Utah Utility Notification Center, Inc., Association Newsletter, vol. 1, No. 1, 8 pages, Nov. 1, 2005.
Blue Stakes of Utah Utility Notification Center, Inc., Association Newsletter, vol. 1, No. 2, 5 pages, Jul. 15, 2006.
Blue Stakes of Utah Utility Notification Center, Inc., Association Newsletter, vol. 3, No. 1, 7 pages, Nov. 2007.
Blue Stakes of Utah Utility Notification Center, Inc., Association Newsletter, vol. 5, No. 1, 7 pages, Dec. 2009.
DigSafely New York, i-Notice, http://www.ufpo.org/excv/Inotice/, (original publication date unknown), printed Jun. 5, 2010, 4 pages.
Eastern Virginia Damage Prevention Committee, Meeting Minutes, Mar. 26, 2009 and May 12, 2009, 6 pages.
Fredericksburg Area Damage Prevention Committee, Meeting Minutes, Dec. 2009.
Georgia UPC EDEN, Web Entry Instruction Manual, www.gaupc.org, Jan. 22, 2009, 60 pages.
GPS Technology Enhancing Underground Utility Locating, Underground Construction Magazine, Apr. 2010, 3 pages.
Illinois One-Call System, NEWTIN Remote Ticket Entry User's Manual, Jun. 12, 2007, 29 pages.
International Search Report and Written Opinion, Application Serial No. PCT/2010/000130, May 18, 2010.
IRTH Internet Manual, Arizona Bluestake, Call Before you Dig, http://www.azbluestake.com/main/download/IRTHNetFeatures.pdf, (original publication date unknown), 47 pages.
IRTH Internet Manual, Georgia Utilities Protection Center, Feb. 16, 2006, 20 pages.
IRTH One Call Centers, Underground Utility Damage Preventioin, Ticket Management, http://www.irth.com/SOLUTIONS/IRTH_ONE_CALL/index.aspx, (original publication date unknown), 2 pages.
Letter from Norfield Data Products to Wolf Greenfield & Sacks, P.C., May 5, 2010, 2 pages.
North Carolina One-Call Center, Newtin Remote Ticket Entry Application Tutorial, Sep. 17, 2009, 24 pages.
North Carolina One-Call Center, Newtin Remote Ticket Entry Quick Map Tutorial, Nov. 2008, 13 pages.
NTDPC One-Call Mapping Notification Processes, http://www.ntdpc.com/ntdpc/faces/ntscf.jsp, (original publication date unknown), 12 pages.
Utility Notification Center of Colorado, Annual Report for Fiscal Year 2004, 41 pages.
Utility Notification Center of Colorado, Annual Report for Fiscal Year 2005, 39 pages.
Utility Notification Center of Colorado, Annual Report for Fiscal Year 2006, 49 pages.
Utility Notification Center of Colorado, Annual Report for Fiscal Year 2007, 44 pages.
Utility Notification Center of Colorado, Annual Report for Fiscal Year 2008, 39 pages.
Virginia Pilot Project for One-call Location Technology, Project Plan, Aug. 2006, 28 pages.
Common Ground Alliance, Best Practices Version 1.0, Apr. 2003.
Common Ground, Study of One-Call Systems and Damage Prevention Best Practices, Aug. 1999.

"Case Study: Wireless mash-up keeps track of Vegas' pipes," TechWorld, http://howto.techworld.com/mobile-wireless/2297/case-study-wireless-mash-up-keeps tra . . . , printed Dec. 16, 2009 (original publication date unknown), 2 pages.

Gopher State One Call—History and Background, http://www.gopherstateonecall.org/history.aspx, printed on Dec. 12, 2009 (original publication date unknown), 2 pages.

Gopher State One Call—Virtual Polygon Fact Sheet, http://www.gopherstateonecall.org/docs/Virtual%20Polygon%20Fact%20Sheet.pdf, printed on Dec. 16, 2009 (original publication date unknown), 4 pages.

Hanneman, J., "Notification and the NMOC Map System," http://nmonecall.org/articles.htm, printed on Dec. 16, 2009 (original publication date unknown), 10 pages.

International Search Report and Written Opinion, Application Serial No. PCT/US2009/01707, May 14, 2009 13 pages.

One Call Concepts Inc.—Company News & Executive Profiles, BNET Industries, http://resources.bnet.com/topic/one_call+concepts+inc..html, printed on Dec. 15, 2009 (original publication date unknown), 6 pages.

One Call Concepts Inc.—Prism Software, http://www.occinc.com/services/prism_software.asp, printed on Dec. 16, 2009 (original publication date unknown), 1 page.

Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.

Pickus, J., "Call USA—Automating "Call Before You Dig" Processes for a Major Utility," GITA's Annual Conference on Apr. 25-28, 2004, 19 pages.

Pickus, J., "Internet GIS for the Municipality," Las Vegas Water District, http://spatialnews.geocomm.com/geonetcom/seminar3.html, printed Dec. 16, 2009 (original publication date unknown), 3 pages.

Schutzberg, A., "Autodesk Positions Itself for 2008 and Beyond," Location Intelligence Articles, Feb. 22, 2008, http://www.locationintelligence.net/articles/2693.html, printed Dec. 16, 2009, 4 pages.

Stocking, A., "Betting on Technology," Mar. 2007, http://www.resources.autodesk.com/files/government/customer_stories/A137-LVTBVVVD_Municipal_Sewer_and_Water_article.pdf, 3 pages.

Utility Notification Center—Membership Details, http://www.callbeforeyoudig.org/himember.htm, printed on Dec. 12, 2009 (original publication date unknown), 12 pages.

R. Pevarski, Letter from the Virginia Utility Protection Service, Inc., dated Apr. 7, 2010.

H.L. Smith, Letter dated Oct. 27, 2010.

H.L Smith, Letter dated Jan. 14, 2011, with two attachments each dated Jan. 5, 2011.

U.S. Appl. No. 13/028,687, filed Feb. 16, 2011, Nielsen et al.

U.S. Appl. No. 12/833,103, filed Jul. 9, 2010, Nielsen et al.

Australian Dial Before You Dig Kit, http://1100.com.au/Portals/0/pdf/DBYD_user_kit_2010.pdf, original publication date unknown, retrieved Sep. 7, 2011, 24 pages.

CGA, Common Ground Alliance, Best Practices, Version 4.0, Mar. 2007, 102 pages.

Chmura, A., "Professional Excavators Enter Tickets Easily Through i-dig," Ohio Call Center, summer 2011, 3 pages.

England & Wales beforeUdig Users Manual v 1.0.0, www.beforeudig.com.uk, original publication date unknown, retrieved Sep. 7, 2011, 22 pages.

IOWA One Call, Design Request System Tutorial, https://docs.google.com/viewer?a=v&pid=explorer&chrome=true&srcid=0Bzflsq-1kKARMzJjYTBjZDEiNTJiYy00YTJml..ThjZjMtY2FkZjlzZWNhNDZi&hl=en&authhey=Clq6zKAN, original publication date unknown, retrieved Nov. 16, 2011, 32 pages.

IRTHNet GIS, http://www.irth.com/index.php?option=com_content&view=article&id=90&Itemid=73, 2010, printed Jul. 30, 2010, 1 page.

ITIC, A guide to using the ITIC system, New Jersey One Call Concepts, Inc., http://www.nj1-call.org/docs/NJ%20ITIC%20Manual.pdf, original publication date unknown, retrieved Nov. 16, 2011, 33 pages.

Kansas One Call Excavator Newsletter, fall 2006, 4 pages, http://www.kansasonecall.com/excavators/newsletter/.

Kansas One Call Excavator Newsletter, winter 2005, 4 pages, http://www.kansasonecall.com/excavators/newsletter/.

New Zealand beforeUdig Users Manual, http://www.beforeudig.co.nz/images/stories/beforeudig%20online%20system%20update%20v.1.1.pdf, original publication date unknown, retrieved Sep. 7, 2011, 3 pages.

Notice of Allowance dated Nov. 15, 2011 from U.S. Appl. No. 13/028,687.

Office Action dated Sep. 29, 2011 from U.S. Appl. No. 12/355,222.

Office Action dated Sep. 29, 2011 from U.S. Appl. No. 12/366,853.

Office Action dated Oct. 3, 2011 from Canadian Application No. 2,718,877.

Office Action dated Oct. 18, 2011 from U.S. Appl. No. 12/355,272.

Office Action dated Nov. 7, 2011 from U.S. Appl. No. 12/422,364.

Office Action dated Nov. 8, 2011 from U.S. Appl. No. 12/050,555.

Office Action dated Nov. 8, 2011 from U.S. Appl. No. 12/239,366.

Office Action dated Nov. 9, 2011 from U.S. Appl. No. 12/239,414.

Office Action dated Nov. 10, 2011 from U.S. Appl. No. 12/355,300.

Office Action dated Oct. 5, 2011 from U.S. Appl. No. 12/422,372.

Office Action dated Sep. 14, 2011 from U.S. Appl. No. 12/475,924.

One Call Concepts Locating Services, Inc., Point Positive Utility Mapping & GIS http://www.occls.com/default.aspx?content=pointpositive, original publication date unknown, retrieved Sep. 21, 2011, 1 page.

PELICAN Corp., beforeUdig mobile, http://www.pelicancorp.com/index.php?option=com_content&view=article&id=145&Itemid=133, original publication date unknown, printed Aug. 30, 2011, 1 page.

PELICAN Corp., DigSAFE OneCall Key Capabilities, http://www.pelicancorp.com/index.php?option=com_content&view=article&id=104&Itemid=121, original publication date unknown, printed Aug. 30, 2011, 2 pages.

PELICAN Corp., DigSAFE Pro Automated Plan Response Server, http://www.pelicancorp.com/index.php?option=com_content&view=article&id=48&Itemid=68, original publication date unknown, printed Aug. 30, 2011, 2 pages.

PELICAN Corp., DigSAFE Pro Automation Workflow, http://www.pelicancorp.com/index.php?option=com_content&view=article&id=119&Itemid=124, original publication date unknown, printed Aug. 30, 2011, 2 pages.

PELICAN Corp., DigSAFE Pro New and Updated features for version 2.4. http://www.pelicancorp.com/index.php?option=com_content&view=article&id=151&Itemid=91, original publication date unknown, printed Aug. 30, 2011, 2 pages.

PELICAN Corp.,How beforeUdig works, http://www.pelicancorp.com/index.php?option=com_content&view=article&id=114&Itemid=105, original publication date unknown, printed Aug. 30, 2011, 1 page.

PELICAN Corp., Using beforeUdig, http://www.pelicancorp.com/index.php?option=com_content&view=article&id=115&Itemid=106, original publication date unknown, printed Aug. 30, 2011, 1 page.

Schall G et a., "Virtual Redlining for Civil Engineering in Real Environments," IEEE International Symposium on Mixed and Augmented Reality Sep. 15-18, 2008, Cambridge, UK, 4 pages.

Singapore beforeudig Frequently Asked Questions, http://www.beforeudig.com.sg/index.php?option=com_content&view=article&id=9&Itemid=10, original publication date unknown, retrieved Nov. 28, 2011, 2 pages.

USA North, "Damage Prevention Update," Jun. 2011 Newsletter, http://www.usenorth.org/2011JuneFinal.pdf, 4 pages.

Notice of Allowance dated Dec. 27, 2011 from U.S. Appl. No. 13/028,687.

Office Action dated Feb. 14, 2011 from U.S. Appl. No. 12/833,103.

Office Action dated Mar. 1, 2012 from U.S. Appl. No. 12/475,924.

Office Action dated Mar. 12, 2012 from U.S. Appl. No. 12/355,272.

Office Action dated Mar. 13, 2012 from U.S. Appl. No. 12/422,372.

U.S. Appl. No. 13/192,138, filed Jul. 6, 2012, Nielsen et al.
U.S. Appl. No. 13/528,164, Jun. 20, 2012, Nielsen et al.
Notice of Allowance dated Jun. 28, 2012 from U.S. Appl. No. 12/050,555.
Notice of Allowance dated Jul. 11, 2012 from U.S. Appl. No. 12/355,300.
Office Action dated Jun. 21, 2012 from U.S. Appl. No. 12/355,272.
Corrected Notice of Allowability dated Jun. 8, 2012 from U.S. Appl. No. 12/366,853.
Notice of Allowability dated Jun. 8, 2012 from U.S. Appl. No. 12/355,222.
Notice of Allowance dated Apr. 11, 2012 from U.S. Appl. No. 12/355,222.
Notice of Allowance dated May 8, 2012 from U.S. Appl. No. 12/366,853.
Office Action dated Mar. 26, 2012 from U.S. Appl. No. 12/422,364.
Office Action dated Mar. 28, 2012 from U.S. Appl. No. 12/475,956.
Office Action dated Apr. 2, 2012 from Canadian Application No. 2,718,877.
Office Action dated May 3, 2012 from U.S. Appl. No. 12/050,555.
Office Action dated May 4, 2012 from U.S. Appl. No. 12/239,414.
Office Action dated May 15, 2012 from U.S. Appl. No. 12/239,366.
Office Action dated May 24, 2012 from U.S. Appl. No. 12/355,300.
Office Action dated Jun. 8, 2012 from U.S. Appl. No. 12/475,905.
Office Action dated Jul. 18, 2012 from U.S. Appl. No. 12/239,414.

* cited by examiner

METHODS AND APPARATUS FOR ASSOCIATING A VIRTUAL WHITE LINE (VWL) IMAGE WITH CORRESPONDING TICKET INFORMATION FOR AN EXCAVATION PROJECT

CROSS-REFERENCE TO RELATED APPLICATIONS

This application claims the benefit, under 35 U.S.C. §119 (e), of U.S. Provisional Application Ser. No. 61/151,769, entitled "MULTI-GENERATIONAL VIRTUAL WHITE LINES (VWL) FOR DELIMITING PLANNED EXCAVATION SITES OF STAGED EXCAVATION PROJECTS," filed on Feb. 11, 2009, which is hereby incorporated herein by reference in its entirety.

BACKGROUND

Excavators are required to notify underground facility owners in advance of their excavation activities and to describe and communicate the geographic area of those activities to the underground facility owners. As a result, excavators may submit a work order (i.e., locate request or ticket) to, for example, a one-call center, which serves as notification to underground facility owners. A locate request (or ticket) may be any communication or instruction to perform a locate operation at a certain dig area, which is any specified geographic area within which excavation may occur. One call centers may receive locate requests from excavators via electronic delivery or verbally through a telephone conversation between the excavator and a human call center operator. Whether communicated electronically or verbally, excavators must describe the planned geographic locations of dig areas. This description may be ultimately reduced to text, which, along with other data about a locate request, is communicated to the appropriate locate service provider.

Textual descriptions of dig areas can be very imprecise as to exact physical locations. In addition, addresses which are provided may be unclear, indicating only cross streets and vague descriptions of the extent of the dig area. Therefore, when a locate request is submitted by an excavator, it may be beneficial for the excavator to supplement the locate request with a visit to the site of the dig area for the purpose of delimiting and/or otherwise indicating the particular geographic location of the proposed excavation. For example, marks may be used to physically delimit a dig area. These marks may consist of chalk or paint that is applied to the surface of the ground, and are generally known as "white lines." The delimited dig area indicates to a locate technician the extent of the boundaries where a locate operation is to be performed according to the locate request that was submitted by the excavator.

However, the use of these physical white lines to physically delimit the dig area may be limited. For example, these physical white lines provide only a temporary indication of the dig area, as the physical white lines may deteriorate or be eliminated over time by such events as precipitation, excessive pedestrian or vehicle traffic, erosion, the excavation process, or numerous other events. Therefore, a need exists for improved ways of delimiting and/or otherwise indicating the proposed excavation site in a more permanent and/or reproducible manner.

Further, certain excavation projects may be suitably large to require that locate operations be performed in multiple stages and/or phases over a period of time. In one example, an excavation project along several miles of a highway may be performed over several days, weeks, and/or months. In another example, an excavation project of a large residential or commercial subdivision again may be performed over several days, weeks, and/or months. The request for locate operations with respect to a multiple-stage excavation project that spans a period of time may be submitted via multiple individual tickets. Alternatively, this request for may be submitted under a single ticket, which is hereafter referred to as a "project ticket." The locate operations with respect to multiple-stage excavation projects must be coordinated between excavators and locate personnel, such as locate technicians. For example, throughout the multiple stages of the excavation project there may be communication between excavators and locate technicians about the location of the respective subsections of the overall dig area to be located and about the timing of the respective locate operations. Further, at each stage of the project, excavators may delimit and/or otherwise indicate the respective subsections of the overall dig area to be located using physical white lines.

Currently, with respect to multiple-stage excavation projects, the communication process between excavators and locate technicians may be poorly coordinated due to poor infrastructure and, therefore, the day-to-day activities of excavators and locate personnel may be poorly synchronized. As a result, there is a risk of locate operations occurring at the wrong subsections of the project dig area and/or at the wrong times. This leads to poor operating efficiencies and, perhaps, lost profit with respect to both excavation companies and locate companies. Furthermore, excavators may perform the planned excavation with a certain amount of uncertainty as to whether a certain locate operation of the project ticket is complete and with limited confidence that the certain locate operation of the project ticket has been performed satisfactorily. As a result, there is a certain amount of risk of damage to underground facilities.

Consequently, a need exists for improved synchronization between excavators and locate personnel with respect to multiple-stage excavation projects in order to better coordinate the day-to-day activities, thereby improving operating efficiency. Further, a need exists for improved communication mechanisms between excavators and locate personnel with respect to project tickets in order to improve efficiency; reduce uncertainty and, thereby, reduce the risk of damage to underground facilities; and improve information exchange for making better and more timely decisions with respect to allocating resources.

SUMMARY

Various embodiments of the present invention are directed to methods, apparatus and systems for creating an electronic record relating to a geographic area including one or more dig areas to be excavated or otherwise disturbed. As part of the electronic record, the dig areas are somehow identified with respect to its immediate surroundings in the geographic area. For example, to create such an electronic record, one or more input images relating to the geographic area including the dig areas may be utilized. For example, source data representing one or more input images of a geographic area including the dig area is received and/or processed so that the input image(s) may be displayed on a display device. At least one dig area is then indicated in some manner on the displayed input image(s) so as to generate one or more marked-up images constituting at least a portion of the electronic record.

In some implementations of the inventive concepts disclosed herein, the electronic record may include a variety of non-image information, such as to facilitate identification of a dig area and/or provide information concerning a multi-stage excavation process. Such non-image information may include, for example, a text description of the dig area, an address or lot number of a property within which the dig area is located, geo-encoded information such as geographic coordinates relating to the dig area and/or various aspects of the geographic area surrounding the dig area, one or more ticket numbers, etc. The marked-up image(s) and the non-image information may be formatted in a variety of manners in the electronic record; for example, in one implementation the non-image information may be included as metadata associated with the marked-up image(s), while in other implementations the marked-up image(s) and the non-image information may be formatted as separate data sets. These separate data sets may be transmitted and/or stored separately, but may nonetheless be linked together in some manner as relating to a common electronic record.

One embodiment described herein is directed to a method for facilitating detection of a presence or an absence of at least one underground facility within a plurality of dig areas comprising a first dig area and at least one additional dig area, wherein at least a portion of the plurality of dig areas may be excavated or disturbed during excavation activities. The method comprises: A) electronically receiving source data representing at least one input image of a geographic area including the first dig area and the at least one additional dig area, wherein the first dig area corresponds to a first stage of an staged excavation project and the at least one additional dig area corresponds to at least one subsequent stage of the staged excavation project; B) processing the source data so as to display at least a portion of the at least one input image on a display device; C) adding, via at least one user input device associated with the display device, at least one first indicator to the displayed at least one input image to provide at least one indication of the first dig area and thereby generate a first generation marked-up digital image; D) adding, via the at least one user input device, at least one additional indicator to the first generation marked-up digital image to provide at least one indication of the at least one additional dig area and thereby generate a multi-generational marked-up digital image; and E) electronically transmitting and/or electronically storing information relating to the multi-generational marked-up digital image so as to facilitate the detection of the presence or the absence of the at least one underground facility within the plurality of dig areas.

Another embodiment is directed to at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises: A) electronically receiving source data representing at least one input image of a geographic area including the first dig area and the at least one additional dig area, wherein the first dig area corresponds to a first stage of an staged excavation project and the at least one additional dig area corresponds to at least one subsequent stage of the staged excavation project; B) processing the source data so as to display at least a portion of the at least one input image on a display device; C) receiving at least one first user input via at least one user input device associated with the display device; D) adding, based on the at least one first user input, at least one first indicator to the displayed at least one input image to provide at least one indication of the first dig area and thereby generate a first generation marked-up digital image; E) receiving at least one second user input via the at least one user input device; F) adding, based on the at least one second user input, at least one additional indicator to the first generation marked-up digital image to provide at least one indication of the at least one additional dig area and thereby generate a multi-generational marked-up digital image; and G) electronically transmitting and/or electronically storing information relating to the multi-generational marked-up digital image so as to facilitate the detection of the presence or the absence of the at least one underground facility within the plurality of dig areas.

A further embodiment is directed to an apparatus for facilitating detection of a presence or an absence of at least one underground facility within a dig area, wherein at least a portion of the dig area may be excavated or disturbed during excavation activities. The apparatus comprises: a communication interface; a display device; at least one user input device; a memory to store processor-executable instructions; and a processing unit coupled to the communication interface, the display device, the at least one user input device, and the memory, wherein upon execution of the processor-executable instructions by the processing unit. The processing unit: controls the communication interface to electronically receive source data representing at least one input image of a geographic area including the first dig area and the at least one additional dig area, wherein the first dig area corresponds to a first stage of an staged excavation project and the at least one additional dig area corresponds to at least one subsequent stage of the staged excavation project; controls the display device to display at least a portion of the at least one input image; acquires at least one first user input from the at least one user input device; generates a first generation marked-up digital image including at least one first indicator overlaid on the at least one input image to provide at least one indication of the first dig area; acquires at least one second user input from the at least one user input device; generates a multi-generational marked-up digital image including at least one additional indicator overlaid on the first generation marked-up digital image to provide at least one indication of the at least one additional dig area; and further controls the communication interface and/or the memory to electronically transmit and/or electronically store information relating to the multi-generational marked-up digital image so as to facilitate the detection of the presence or the absence of the at least one underground facility within the plurality of dig areas.

Another embodiment is directed to a method for facilitating detection of a presence or an absence of at least one underground facility within a plurality of dig areas comprising a first dig area and a second dig area, wherein at least a portion of the first and second dig areas may be excavated or disturbed during excavation activities. The method comprises: A) electronically receiving first source data representing a first input image of a geographic area including a first dig area, wherein the first dig area corresponds to a first stage of an staged excavation project; B) processing the first source data so as to display at least a portion of the first input image on the display device; C) adding, via at least one user input device associated with the display device, at least one first indicator to the displayed first input image to provide at least one indication of the first dig area and thereby generate a first marked-up digital image; D) electronically receiving second source data representing a second input image of a geographic area including a second dig area, wherein the second dig area corresponds to a subsequent stage of the staged excavation project; E) processing the second source data so as to display at least a portion of the second input image on the display device; F) adding, via the at least one user input device, at least one second indicator to the displayed second input image to provide at least one indication of the second dig area and thereby generate a second marked-up digital image; and G) electronically transmitting and/or electronically storing first information relating to the first marked-up digital image together with second information relating to the second marked-up digital image so as to facilitate the detection of the presence or the absence of the at least one underground facility within the first and second dig areas.

A further embodiment is directed to at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises: A) electronically receiving first source data representing a first input image of a geographic area including a first dig area, wherein the first dig area corresponds to a first stage of an staged excavation project; B) processing the first source data so as to display at least a portion of the first input image on the display device; C) receiving at least one first user input via at least one user input device associated with the display device; D) adding, based on the at least one first user input, at least one first indicator to the displayed first input image to provide at least one indication of the first dig area and thereby generate a first marked-up digital image; E) electronically receiving second source data representing a second input image of a geographic area including a second dig area, wherein the second dig area corresponds to a subsequent stage of the staged excavation project; F) processing the second source data so as to display at least a portion of the second input image on the display device; G) receiving at least one second user input via the at least one user input device; H) adding, based on the at least one second user input, at least one second indicator to the displayed second input image to provide at least one indication of the second dig area and thereby generate a second marked-up digital image; and I) electronically transmitting and/or electronically storing first information relating to the first marked-up digital image together with second information relating to the second marked-up digital image so as to facilitate the detection of the presence or the absence of the at least one underground facility within the first and second dig areas.

Another embodiment is directed to an apparatus for facilitating detection of a presence or an absence of at least one underground facility within a dig area, wherein at least a portion of the dig area may be excavated or disturbed during excavation activities. The apparatus comprises: a communication interface; a display device; at least one user input device; a memory to store processor-executable instructions; and a processing unit coupled to the communication interface, the display device, the at least one user input device, and the memory, wherein upon execution of the processor-executable instructions by the processing unit. The processing unit: controls the communication interface to electronically receive first source data representing a first input image of a geographic area including a first dig area, wherein the first dig area corresponds to a first stage of an staged excavation project; controls the display device to display at least a portion of the first input image on the display device; acquires at least one first user input from the at least one user input device; generates a first marked-up digital image including at least one first indicator overlaid on the first input image to provide at least one indication of the first dig area; controls the communication interface to electronically receive second source data representing a second input image of a geographic area including a second dig area, wherein the second dig area corresponds to a subsequent stage of the staged excavation project; controls the display device to display at least a portion of the second input image on the display device; acquires at least one second user input from the at least one user input device; generates a second marked-up digital image including at least one second indicator overlaid on the second input image to provide at least one indication of the second dig area; and further controls the communication interface and/or the memory to electronically transmit and/or electronically store first information relating to the first marked-up digital image together with second information relating to the second marked-up digital image so as to facilitate the detection of the presence or the absence of the at least one underground facility within the first and second dig areas.

One embodiment is directed to an apparatus for facilitating detection of a presence or an absence of at least one underground facility within a dig area, wherein at least a portion of the dig area may be excavated or disturbed during excavation activities. The apparatus comprises a communication interface; a memory to store processor-executable instructions; and a processing unit coupled to the communication interface and the memory. Upon execution of the processor-executable instructions by the processing unit, the processing unit digitally searches the memory to identify a descriptor file corresponding to a ticket; based on identifying information in the descriptor file, identifies at least one image corresponding to the ticket, the at least one image comprising at least one indication of at least one dig area; electronically bundles the at least one image with ticket information from the ticket to generate the ticket bundle; and provides the ticket bundle to at least one party associated with the at least one underground facility.

Another embodiment is directed to at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises A) digitally searching a memory to identify a descriptor file corresponding to a ticket; B) based on identifying information in the descriptor file, digitally searching for at least one image corresponding to the ticket, the at least one image comprising at least one indication of at least one dig area; C) electronically bundling the at least one image with ticket information from the ticket to generate a ticket bundle; and D) providing the ticket bundle to at least one party associated with the at least one underground facility.

A further embodiment is directed to a method for facilitating detection of a presence or an absence of at least one underground facility within at least one dig area, wherein at least a portion of the at least one dig areas may be excavated or disturbed during excavation activities. The method comprises A) digitally searching a memory to identify a descriptor file corresponding to a ticket; B) based on identifying information in the descriptor file, digitally searching for at least one image corresponding to the ticket, the at least one image comprising at least one indication of at least one dig area; C) electronically bundling the at least one image with ticket information from the ticket to generate a ticket bundle; and D) providing the ticket bundle to at least one party associated with the at least one underground facility.

Another embodiment is directed to an apparatus for facilitating detection of a presence or an absence of at least one underground facility within a dig area, wherein at least a portion of the dig area may be excavated or disturbed during excavation activities. The apparatus comprises a communication interface; a memory to store processor-executable instructions; and a processing unit coupled to the communication interface and the memory. Upon execution of the processor-executable instructions by the processing unit, the processing unit: electronically receives, via the communication interface, at least one image corresponding to at least one ticket or at least one link to the at least one image, the at least one image comprising at least one indication of at least one dig area, and data relating to the at least one image; based on the data relating to the at least one image, identifies ticket information in the memory corresponding to the at least one ticket; electronically bundles the at least one image or the at least one link with the ticket information to generate a ticket bundle; and provides the ticket bundle, via the communication interface, to at least one party associated with the at least one underground facility.

A further embodiment is directed to at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises A) electronically receiving at least one image corresponding to at least one ticket or at least one link to the at least one image, the at least one image comprising at least one indication of at least one dig area, and data relating to the at least one image; B) based on the data relating to the at least one image, identifying ticket information corresponding to the at least one ticket; C) electronically bundling the at least one image or the at least one link with the ticket information to generate a ticket bundle; and D) providing the ticket bundle to at least one party associated with the at least one underground facility.

Another embodiment is directed to a method for facilitating detection of a presence or an absence of at least one underground facility within at least one dig area, wherein at least a portion of the at least one dig areas may be excavated or disturbed during excavation activities. The method comprises A) receiving at least one image corresponding to at least one ticket or at least one link to the at least one image, the at least one image comprising at least one indication of at least one dig area, and data relating to the at least one image; B) based on the data relating to the at least one image, identifying ticket information corresponding to the at least one ticket; C) electronically bundling the at least one image or the at least one link with the ticket information to generate a ticket bundle; and D) providing the ticket bundle to at least one party associated with the at least one underground facility.

A further embodiment is directed to an apparatus for facilitating detection of a presence or an absence of at least one underground facility within a dig area, wherein at least a portion of the dig area may be excavated or disturbed during excavation activities. The apparatus comprises a communication interface; a memory to store processor-executable instructions; and a processing unit coupled to the communication interface and the memory. Upon execution of the processor-executable instructions by the processing unit, the processing unit: electronically receives, via the communication interface, at least one user input relating to the dig area; based on the at least one user input, renders a digital virtual white line image including at least one indicator to provide at least one indication of the dig area with respect to a geographic area; and transmits a limited access file comprising information relating to the digital virtual white line image, via the communication interface, to at least one party associated with the at least one underground facility so as to facilitate the detection of the presence or the absence of the at least one underground facility within the dig area.

Another embodiment is directed to a method for facilitating detection of a presence or an absence of at least one underground facility within a dig area, wherein at least a portion of the dig area may be excavated or disturbed during excavation activities. The method comprises A) electronically receiving at least one user input relating to the dig area; B) based on the at least one user input, rendering a digital virtual white line image including at least one indicator to provide at least one indication of the dig area with respect to a geographic area; and C) electronically transmitting a limited access file comprising information relating to the digital virtual white line image to at least one party associated with the at least one underground facility so as to facilitate the detection of the presence or the absence of the at least one underground facility within the dig area.

A further embodiment is directed to at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises A) electronically receiving at least one user input relating to the dig area; B) based on the at least one user input, rendering a digital virtual white line image including at least one indicator to provide at least one indication of the dig area with respect to a geographic area; and C) electronically transmitting a limited access file comprising information relating to the digital virtual white line image to at least one party associated with the at least one underground facility so as to facilitate the detection of the presence or the absence of the at least one underground facility within the dig area.

This application incorporates by reference the following U.S. published patent applications: U.S. publication no. 2008-0228294-A1, published Sep. 18, 2008, filed Mar. 13, 2007, and entitled "Marking System and Method With Location and/or Time Tracking;" and U.S. publication no. 2008-0245299-A1, published Oct. 9, 2008, filed Apr. 4, 2007, and entitled "Marking System and Method." Further, this application incorporates by reference the following co-pending U.S. patent application: U.S. patent application Ser. No. 12/422,364, entitled "VIRTUAL WHITE LINES (VWL) APPLICATION FOR INDICATING A PLANNED EXCAVATION OR LOCATE PATH," filed on Apr. 13, 2009.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION

Figure 1:
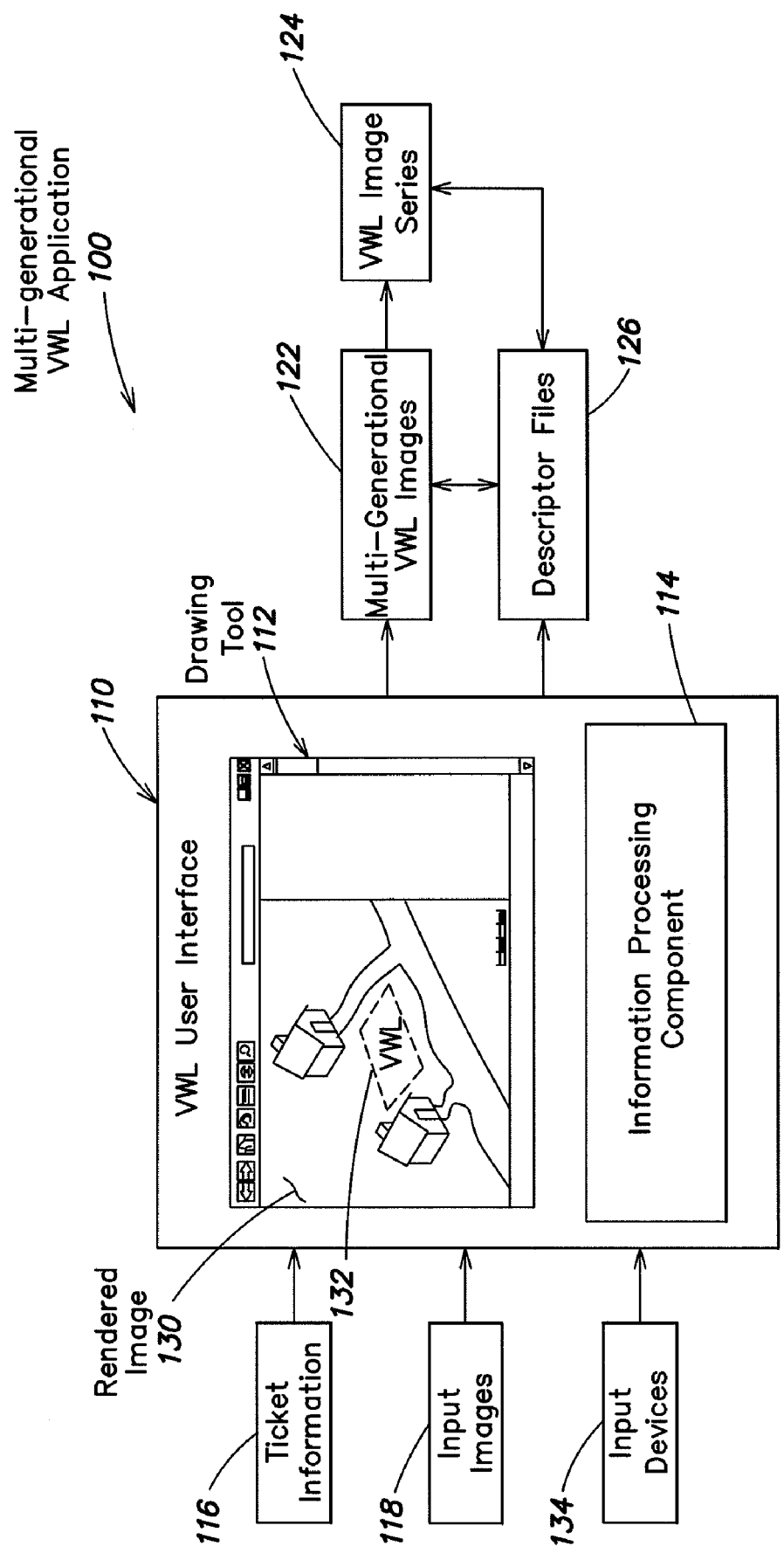
FIG. 1 illustrates a functional block diagram of a multi-generational virtual white lines application for delimiting planned excavation sites of staged excavation projects, according to the present disclosure.

Following below are more detailed descriptions of various concepts related to, and embodiments of, inventive methods and apparatus according to the present disclosure for associating one or more virtual white line images with corresponding ticket information for a given excavation project. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various embodiments described herein are directed to methods, apparatus and systems for creating an electronic record relating to a geographic area including a dig area to be excavated or otherwise disturbed. The electronic record may comprise one or more virtual white line (VWL) images for delimiting one or more planned excavation sites. In some examples, the excavation projects are staged excavation projects, and the term "multi-generational" refers to the excavation stages of multiple related tickets and/or a project ticket. One or more VWL images may be created using a VWL application that allows a user to generate (e.g., draw) one or more virtual white lines for electronically delimiting one or more dig areas. The virtual white line(s) may be overlaid on an input image depicting a geographic area including one or more dig areas, for example. In a multistage excavation project, each of the multiple virtual white lines may be manually and/or automatically ordered and dated with respect to a timetable of the multiple-stage excavation project. In embodiments described herein relating to multi-generational staged excavation projects, as well as in other embodiments relating to more limited excavation projects in connection with a given dig area (e.g., as described in some embodiments of methods and apparatus disclosed in U.S. Patent Publication Nos. 2008-0228294-A1 and 2008-0245299-A1, hereby incorporated herein by reference), methods and apparatus according to the present disclosure allow the image(s) and other information associated with one or more virtual white lines to be electronically bundled with the ticket information and dispatched to the locate personnel for viewing when performing the locate operation(s).

The multi-generational VWL application, system and/or method described herein may provide tools for clearly conveying information about planned excavation, such as a multiple-stage excavation project. The information may comprise, for example, the limits of one or more dig areas. The information about the planned excavation may be provided in a substantially permanent and/or reproducible manner so that the information may be referenced throughout the duration of the planned excavation. Plans for staged excavation may be documented with respect to, for example, multiple related tickets and/or project tickets.

Further, the multi-generational VWL application, system and/or method described herein may provide improved communication mechanisms between excavators and locate personnel for synchronizing staged excavation activities and locate operations. As a result, improved operating efficiency may be achieved for both excavation companies and locate service providers. Improved information exchange allows excavation companies and locate service providers to make better and more timely decisions with respect to allocating resources.

The improved tools and communication mechanisms between excavators and locate personnel may reduce or eliminate the uncertainty for excavators about the status and/or quality of locate operations, and thereby reduce or eliminate the risk of damage to underground facilities.

FIG. 1 illustrates a functional block diagram of an exemplary multi-generational VWL application 100 for delimiting planned excavation sites of staged excavation projects. Multi-generational VWL application 100 may be, for example, a web-based application that is accessible via the Internet. In another embodiment, multi-generational VWL application 100 may be a desktop application that is running on the user's local computing device.

Multi-generational VWL application 100 may include, but is not limited to, a VWL user interface 110 that may further include a drawing tool 112 and an information processing component 114. Certain inputs to the VWL application may include, but are not limited to, one-call center information 116, input images 118, and user inputs received via one or more user input devices 134. Certain outputs of multi-generational VWL application 100 may include, but are not limited to, one or more multi-generational VWL images 122 and/or a collection of multi-generational VWL images 122 that are arranged in a series, such as VWL image series 124, along with a corresponding set of descriptor files 126.

VWL user interface 110 may be a web-based graphical user interface (GUI) that is accessible via the Internet. VWL user interface 110 may provide a secure login function, which allows users, such as excavators and/or system administrators, to access the functions of multi-generational VWL application 100. In one example, excavators may login to multigenerational VWL application 100 via VWL user interface 110 and enter user-specific information which may be saved in, for example, a user profile. The user-specific information may include, for example, the excavators name, user-ID, and excavation company name.

Drawing tool 112 may be a drawing application, which, in excavation applications, may be used by excavators as a dig area marking tool. More specifically, drawing tool 112 may be used by the excavator to add markings to any digital image that corresponds to the geographic location of the dig area, which may be read into multi-generational VWL application 100 from input images 118.

It should be appreciated that the multi-generational virtual white lines application described in connection with FIG. 1 is merely exemplary and that many implementations of such an application are possible. For example, the drawing application or dig area marking tool application described in each of U.S. patent application Ser. No. 12/366,853 entitled "VIRTUAL WHITE LINES FOR INDICATING PLANNED EXCAVATION SITES ON ELECTRONIC IMAGES" filed on Feb. 6, 2009, and U.S. patent application Ser. No. 12/050,555 entitled "VIRTUAL WHITE LINES FOR DELIMITING PLANNED EXCAVATION SITES" filed on Mar. 18, 2008, which are hereby incorporated by reference herein in their entireties, may be configured to create single or multi-generational virtual white line images. In addition, the user device described in each of U.S. patent application Ser. Nos. 12/366,853 and 12/050,555 may be used as a hardware interface to create the multi-generational VWL images described herein.

For purposes of the present disclosure, an input image 118 is any image represented by source data that is electronically processed (e.g., the source data is in a computer-readable format) to display the image on a display device. An input image 118 may include any of a variety of paper/tangible image sources that are scanned (e.g., via an electronic scanner) or otherwise converted so as to create source data (e.g., in various formats such as XML, PDF, JPG, BMP, etc.) that can be processed to display the input image 118. An input image 118 also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images 118 described herein may be created, provided, and/or processed by a geographic information system (GIS) that captures, stores, analyzes, manages and presents data referring to (or linked to) location, such that the source data representing the input image 118 includes pixel information from an image acquisition device (corresponding to an acquired "real world" scene or representation thereof), and/or spatial/geographic information ("geo-encoded information"). In this manner, a GIS provides a framework for data manipulation and display of images that may facilitate one or more of (a) location verification, (b) location correlation, (c) locational relationships, (d) district coding, (e) route analysis, (f) area analysis and (g) mapping/display creation, for example.

Figure 7:
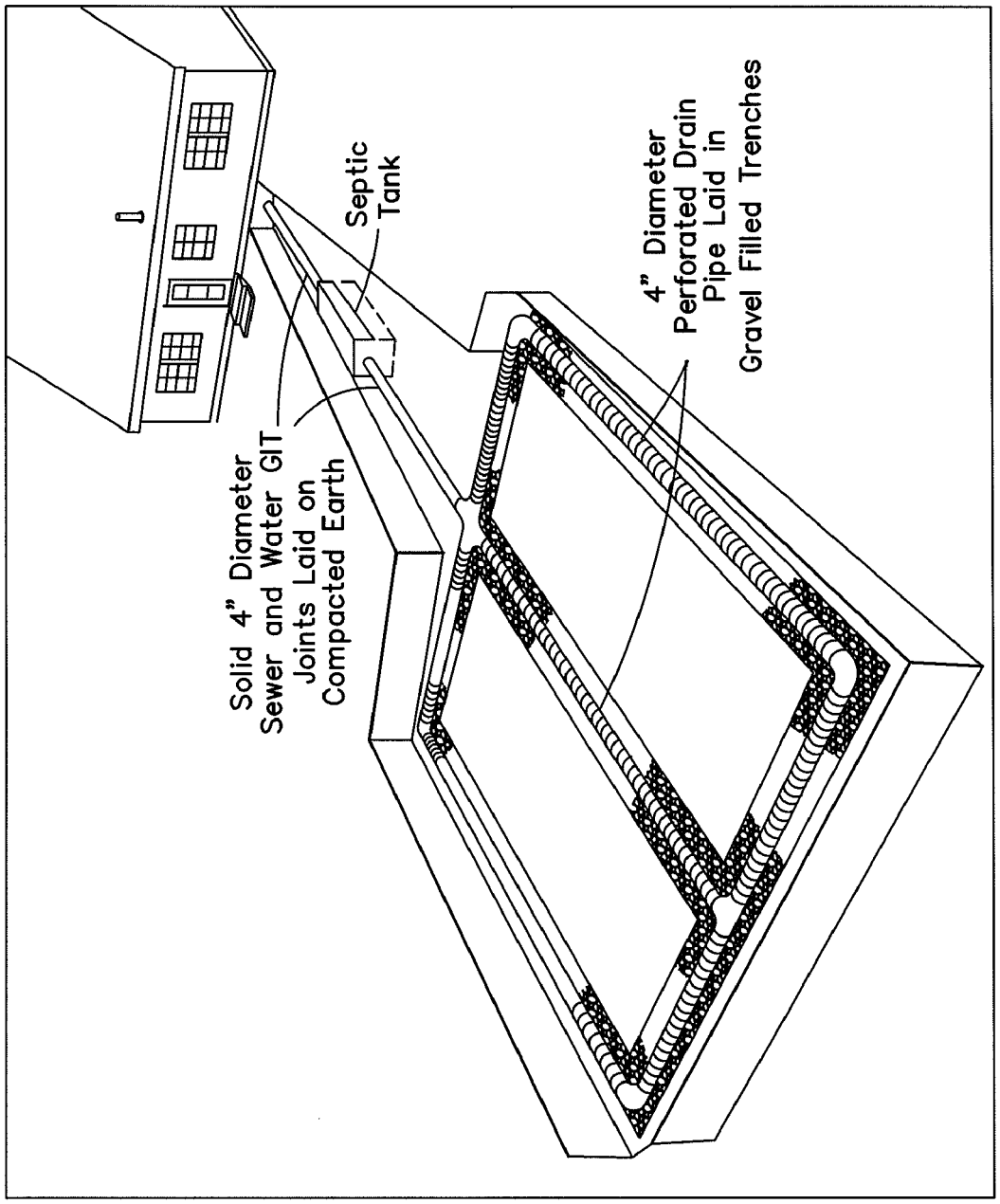
FIG. 7 shows a sketch 700, representing an exemplary input image.
Figure 8:
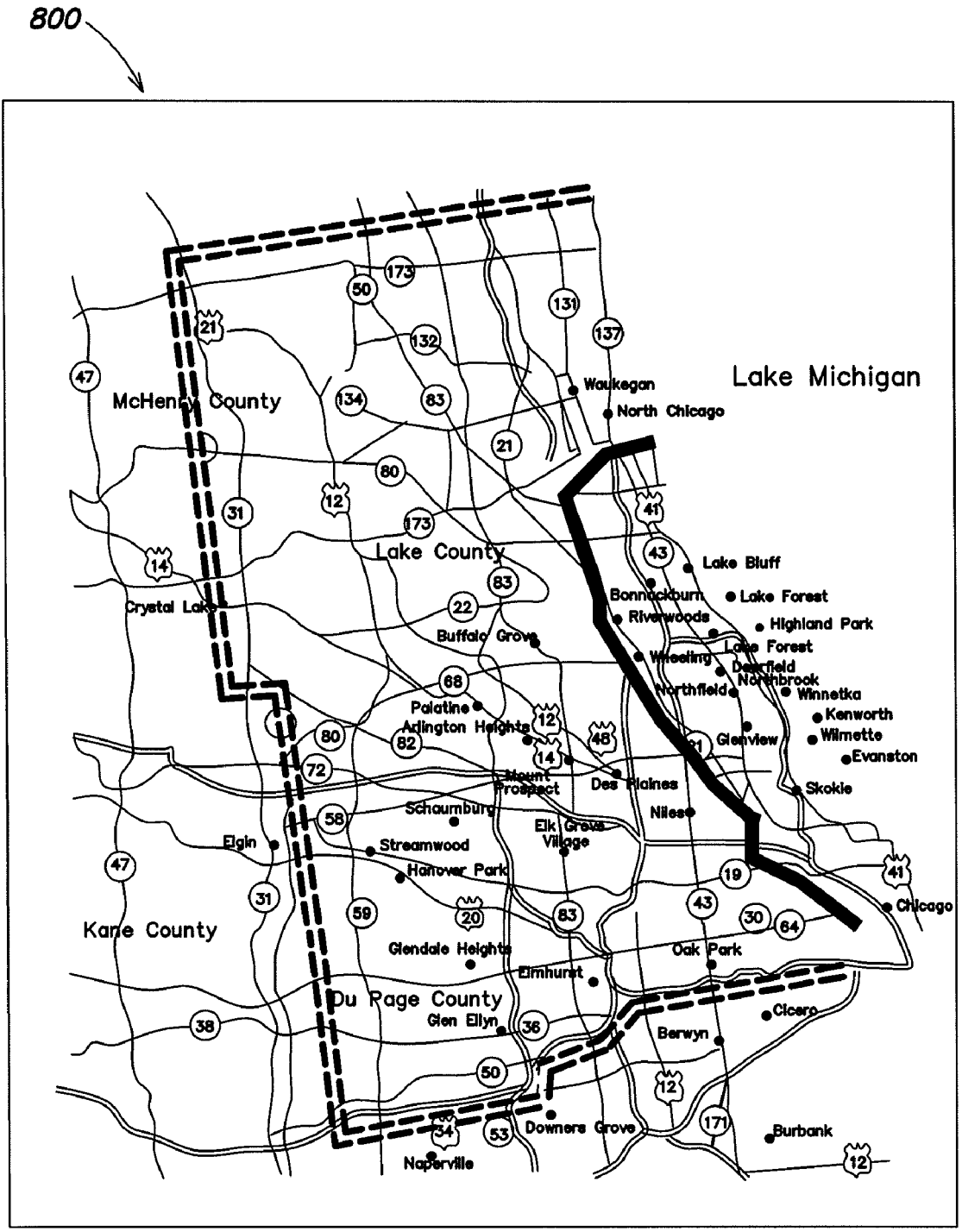
FIG. 8 shows a map 800, representing an exemplary input image.
Figure 9:
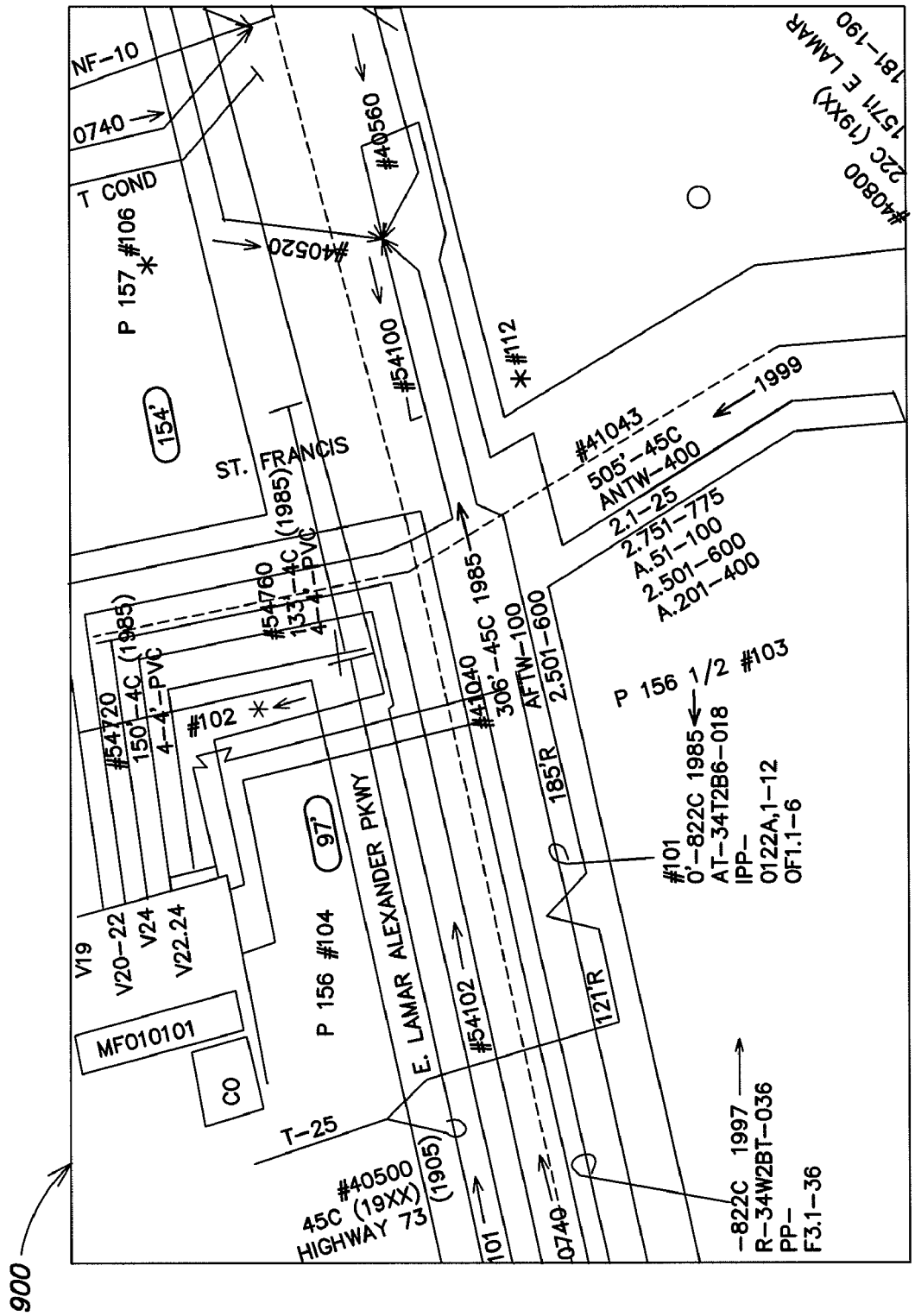
FIG. 9 shows a facility map 900, representing an exemplary input image.
Figure 10:
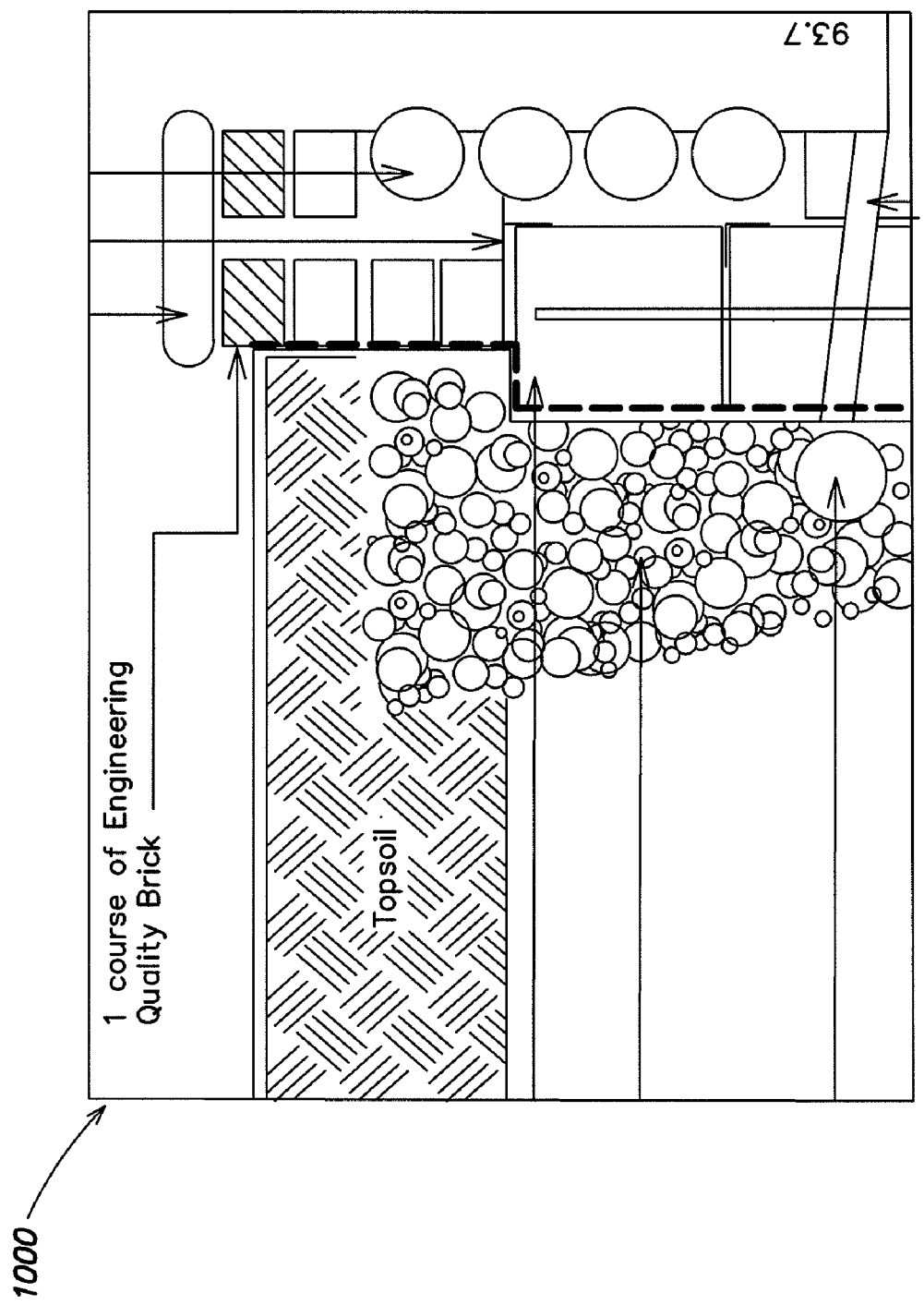
FIG. 10 shows a construction/engineering drawing 1000, representing an exemplary input image.
Figure 11:
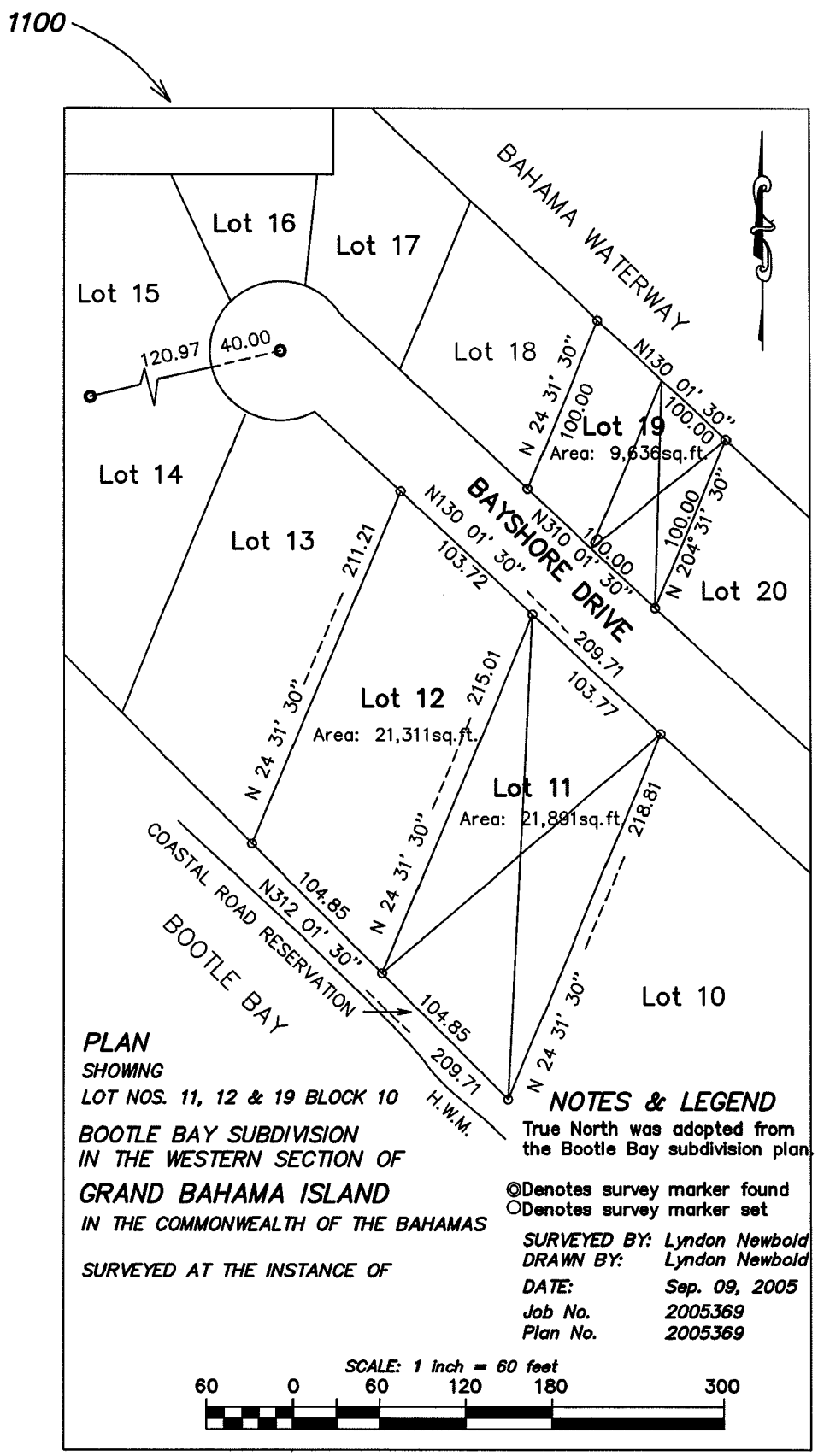
FIG. 11 shows a land survey map 1100, representing an exemplary input image.
Figure 12:
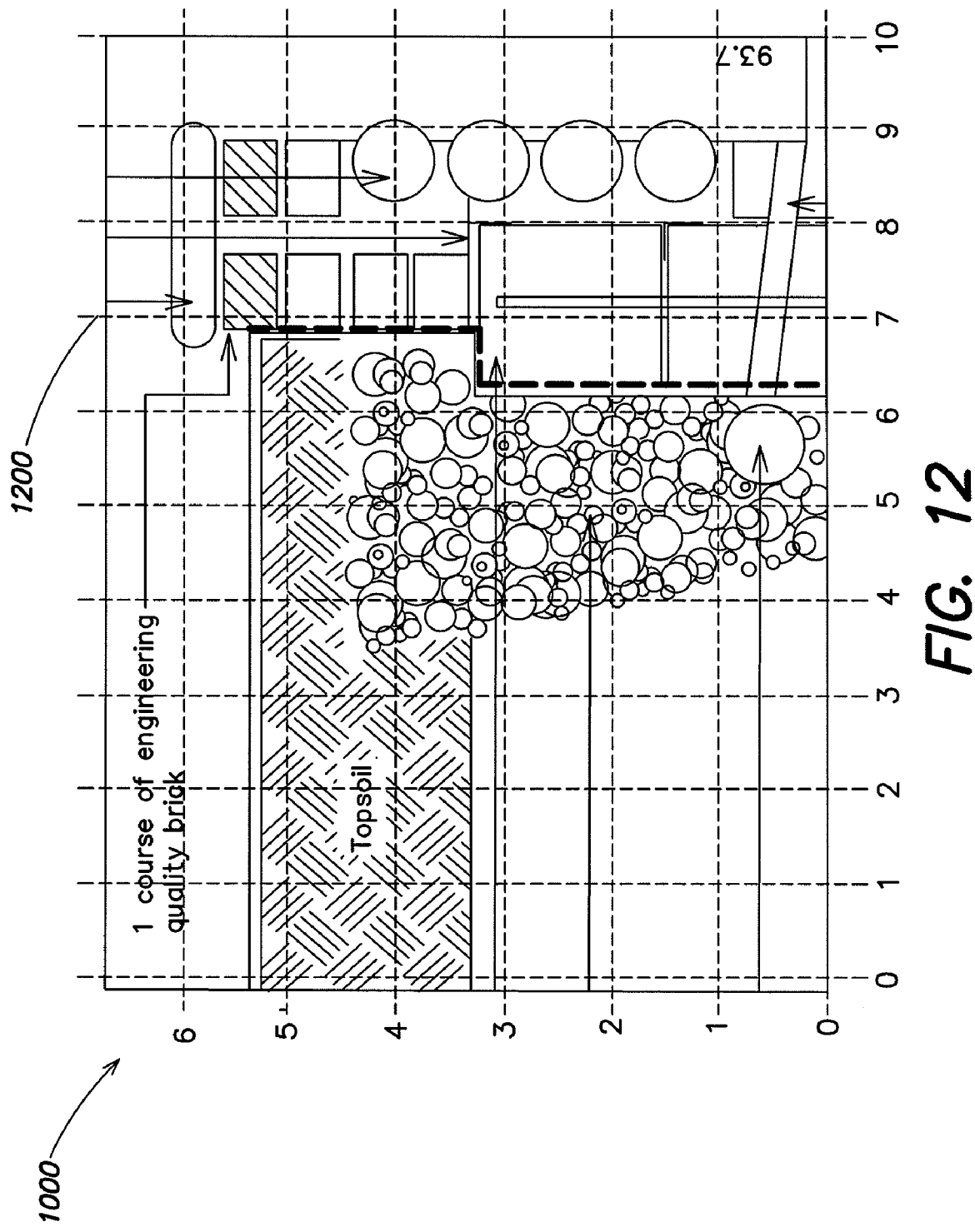
FIG. 12 shows a grid 1200, overlaid on the land survey map 1100 of FIG. 11, representing an exemplary input image.
Figure 13:
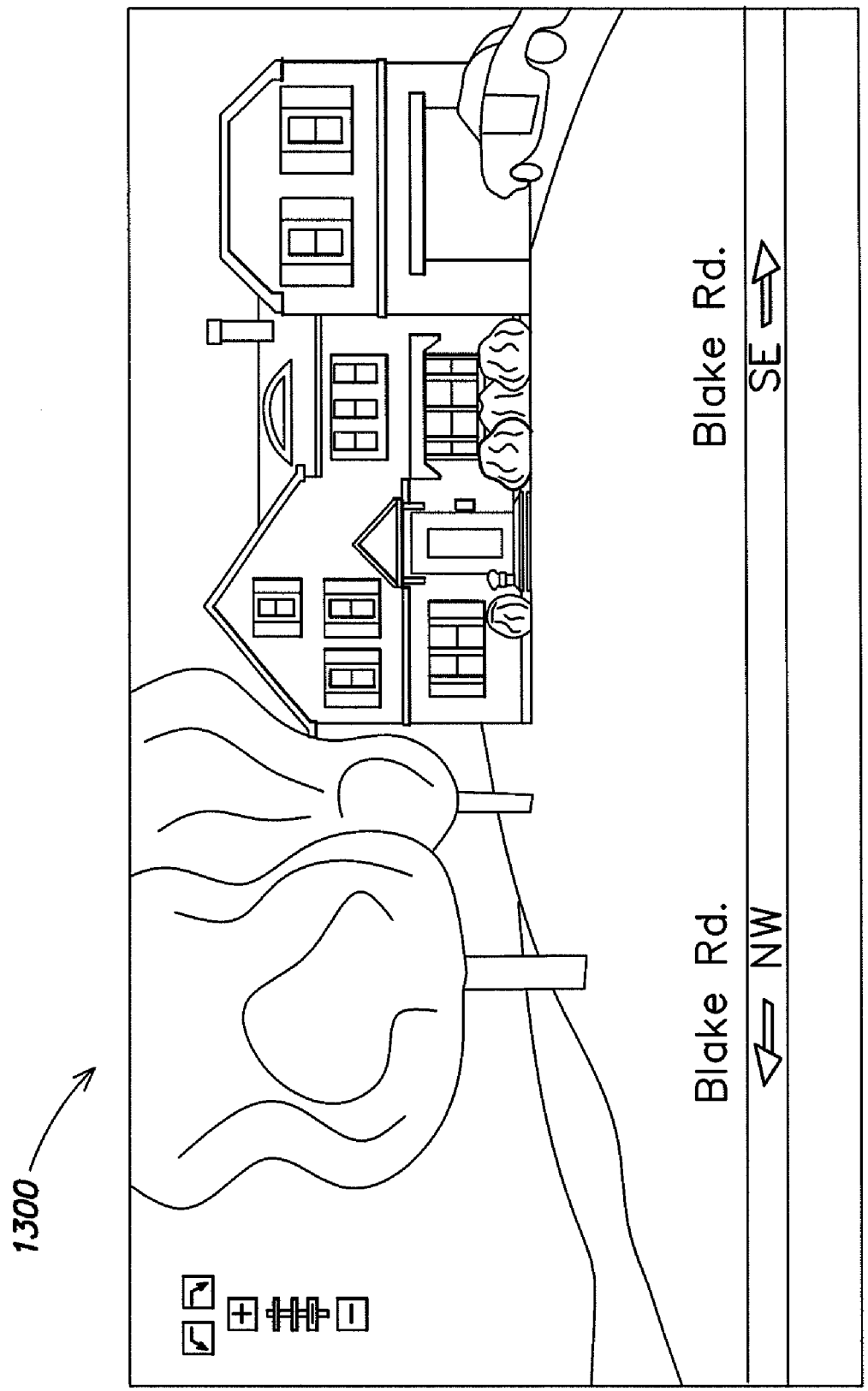
FIG. 13 shows a street level image 1300, representing an exemplary input image.

In view of the foregoing, various examples of input images and source data representing input images 118 described herein, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.). FIG. 7 shows an exemplary sketch 700;

Various maps indicating surface features and/or extents of geographical areas, such as street/road maps (e.g., map 800 of FIG. 8), topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map. An exemplary facility map 900 is shown in FIG. 9;

Architectural, construction and/or engineering drawings and virtual renditions of a space/geographic area (including "as built" or post-construction drawings). An exemplary construction/engineering drawing 1000 is shown in FIG. 10;

Land surveys, i.e., plots produced at ground level using references to known points such as the center line of a street to plot the metes and bounds and related location data regarding a building, parcel, utility, roadway, or other object or installation. FIG. 11 shows an exemplary land survey map 1100;

A grid (a pattern of horizontal and vertical lines used as a reference) to provide representational geographic information (which may be used "as is" for an input image 118 or as an overlay for an acquired "real world" scene, drawing, map, etc.). An exemplary grid 1200, overlaid on construction/engineering drawing 1000, is shown in FIG. 12. It should be appreciated that the grid 1200 may itself serve as the input image (i.e., a "bare" grid), or be used together with another underlying input image;

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image 118, and may be in any of a variety of computer-readable formats, including XML); and Photographic renderings/images, including street level (see e.g., street level image 1300 of FIG. 13), topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that source data representing an input image 118 may be compiled from multiple data/information sources; for example, any two or more of the examples provided above for input images and source data representing input images 118, or any two or more other data sources, can provide information that can be combined or integrated to form source data that is electronically processed to display an image on a display device.

Once read into multi-generational VWL application 100 from input images 118, a digital image may be rendered in the viewing window of drawing tool 112. In one example, FIG. 1 shows a rendered image 130 that is displayed in the viewing window of drawing tool 112. The markings that the excavator adds to rendered image 130 are used to graphically delimit and/or otherwise indicate the dig area. For example and referring to FIG. 1, drawing tool 112 may be used to superimpose over or otherwise display one or more "virtual white lines" (VWL) 132 for delimiting and/or otherwise indicating the planned excavation upon rendered image 130.

Creating a "single-generational" VWL image is described in U.S. patent application Ser. Nos. 12/366,853 and 12/050,055 and may involve the steps of sending an image to a user via a network; receiving a marked-up version of the image from the user via the network that includes one or more virtual white lines added to the image that indicate a dig area in which excavation is planned; and providing the marked-up version of the image, via one of an electronic or tangible delivery system, to another entity. The virtual white lines may include two-dimensional (2D) drawing shapes, shades, points, lines, symbols, coordinates, data sets, or other indicators to indicate on a digital image the dig area in which excavation is to occur. A drawing tool may be provided that allows the user to provide one or more dig area indicators to indicate the dig area (e.g., delimit or mark lines that indicate a line or path of planned excavation) and to enter textual information on the image. The marked-up image may be saved as a VWL image, associated with a certain locate request (or ticket), transmitted to locate personnel, and used by locate personnel during locate operations with respect to the line or path of planned excavation.

In addition to creating "single-generational" VWL images, the multi-generational VWL application 100 described herein provides the capability to create multi-generational virtual white lines for delimiting and/or otherwise indicating planned excavation with respect to multiple-stage excavation projects. For example, the virtual white lines may indicate a line or path of planned excavation with respect to multiple-stage excavation projects.

As used herein, "virtual white lines" (VWLs) may include lines, such as single-segment lines, multiple-segment lines, substantially straight lines, curved lines, and the like; 2D drawing shapes; shades; points; symbols; coordinates; data sets; or other indicators to delimit and/or otherwise indicate on an image one or more dig areas in which excavation is to occur. With respect to multiple-stage excavation projects, examples of multi-generational virtual white lines that may be created using drawing tool 112 are shown with reference to FIGS. 2, 3, and 4.

Information processing component 114 may be a software component of multi-generational VWL application 100 (e.g., a processing unit executing processor-executable instructions stored in memory) for entering and/or associating other information with the multi-generational virtual white lines that are created using drawing tool 112. This information may include excavator-specific, one-call center-specific, and/or other ticket information.

Ticket information 116 provides a source of information that may be processed using VWL user interface 110 of multi-generational VWL application 100. For example, ticket information 116 may include the geographic location(s) of one or more dig areas designated for excavation, for which a locate operation is being requested. Ticket information 116 generally is provided by a one-call center and may include one or more addresses of dig areas, or other location information (e.g., GPS latitude and longitude coordinates). Also, the ticket information 116 may specify a project or multi-stage excavation. Based on address and/or other information, the ticket information 116 may be filtered when presented to the user of multi-generational VWL application 100.

When an excavator completes the sketch of the virtual white lines of the proposed dig area, e.g., VWL 132 on rendered image 130, the marked-up image may be saved as one or more multi-generational VWL images 122. One or more multi-generational VWL images 122 may be associated with multiple related tickets and/or a project ticket, as discussed in greater detail below. In particular, multiple multi-generational VWL images 122 that are associated with staged excavation may be aggregated and saved as a VWL image series 124.

In one exemplary implementation, each multi-generational VWL image 122 and/or each multi-generational VWL image 122 of a VWL image series 124 may have one or more corresponding descriptor files 126. When each VWL image series 124 is saved, the corresponding descriptor files 126 include(s) information about the multi-generational VWL images 122 of the VWL image series 124. For example and with respect to multiple-stage excavation projects, each descriptor file 126 may include, for example, the ticket numbers, the names of multi-generational VWL images 122 of the VWL image series 124, the stage number and stage date with respect to the ticket, and the like. Other information that may be included in one or more descriptor files 126 includes, but is not limited to date and time information indicating when the VWL image was created, an identifier for the creator of the VWL image (e.g., the excavator), location information (geo-coordinates) for the VWL indicating the dig area (dig area indicators), provider information relating to a service (e.g., the image server 516) for the underlying image on which a VWL is created, latitude/longitude and/or altitude information relating to the underlying image, and the like. Descriptor files 126 provide a mechanism by which the multi-generational VWL application 100 may be queried by another application, such as a ticket management application, for processing multi-generational VWL images 122 of the VWL image series 124. In one example, descriptor file(s) 126 may be extensible markup language (XML) files that are created during a save process for the multi-generational VWL images 122. More details of a system and method of using multi-generational VWL application 100 are described with reference to FIGS. 5, 6A, and 6B.

In a "one image-to-multiple VWL" scenario, when the geographic area of the ticket is suitably small to be shown fully on a single image, only one image need be read from input images 118 into multi-generational VWL application 100 and then multiple virtual white lines are created thereon in order to delimit the multiple dig areas, respectively, of staged excavation of multiple related tickets and/or project ticket. An example of this scenario is described with reference to FIG. 2.

In a "multiple image-to-multiple VWL" scenario, when the geographic area of the multiple related tickets and/or project ticket is suitably large that it cannot be shown fully with a sufficient level of detail on a single image, multiple images may be read from input images 118 into multi-generational VWL application 100 and then at least one virtual white line (at least one dig area indicator) is created on each image in succession. An example of this scenario is described with reference to FIGS. 3 and 4.

Figure 2:
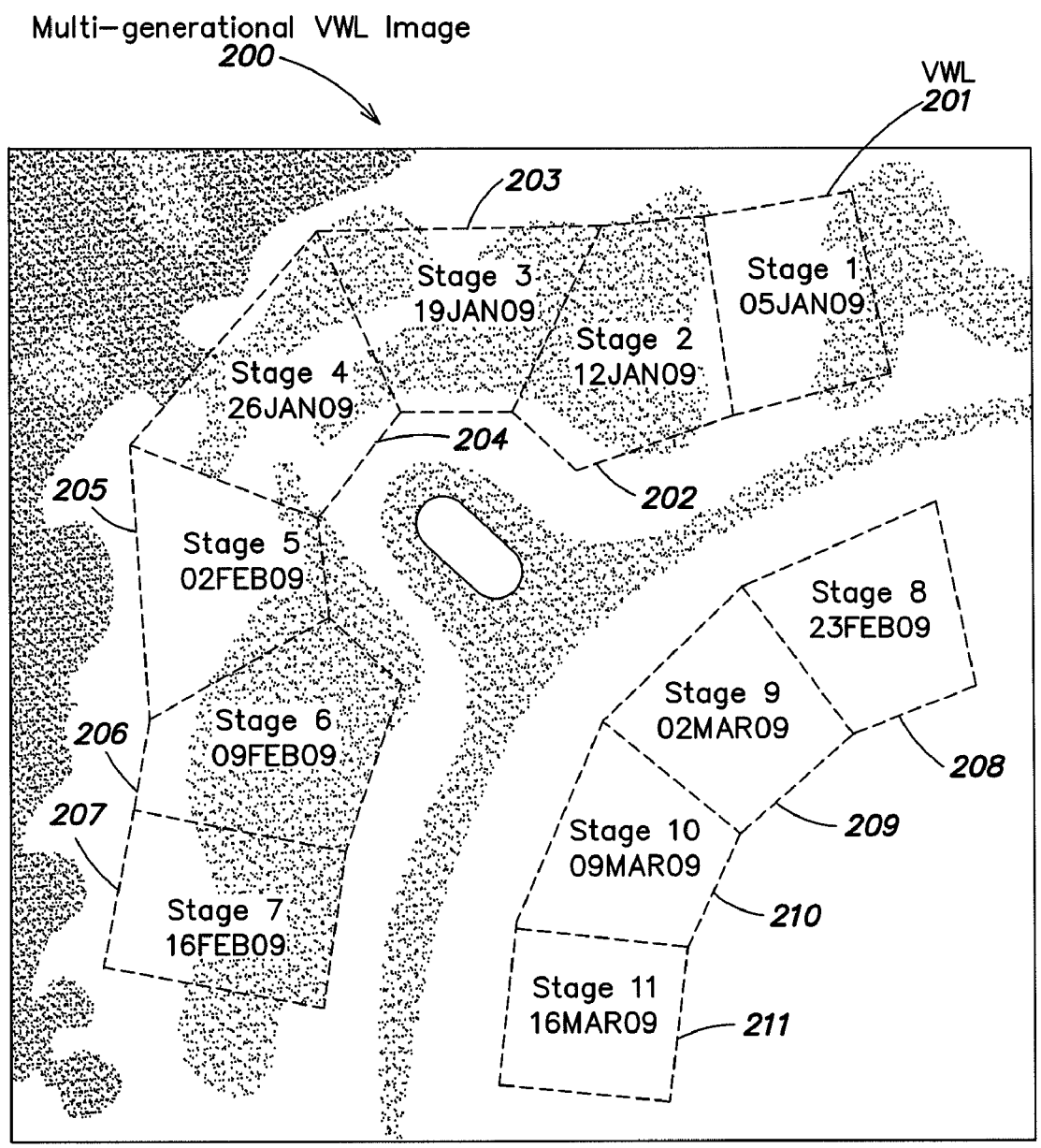
FIG. 2 illustrates a view of a multi-generational virtual white lines image, which shows the one image-to-multiple virtual white lines scenario of the multi-generational virtual white lines application, according to the present disclosure.

Referring to FIG. 2, a view of a multi-generational VWL image 200, which shows the "one image-to-multiple VWL" scenario of multi-generational VWL application 100, is presented. More specifically, FIG. 2 shows an example in which the geographic area of a certain ticket is suitably small to be shown fully on a single image, such as multi-generational VWL image 200. Multi-generational VWL image 200 further shows multiple virtual white lines that delimit multiple planned excavations that are staged to occur over time with respect to the multiple related tickets and/or project ticket. For example, multi-generational VWL image 200 shows a VWL 201, which may be the VWL for the first stage of excavation; a VWL 202, which may be the VWL for the second stage of excavation; a VWL 203, which may be the VWL for the third stage of excavation; and so on through a VWL 211, which may be the VWL for the eleventh stage of excavation. VWL 201 through VWL 211 correspond to contiguous stages of the multiple-stage project. VWL 201 through VWL 211 are created by use of VWL user interface 110 of multi-generational VWL application 100.

Further, each VWL may be automatically labeled and dated according to the planned excavation order and dates of the multiple related tickets and/or project ticket. For example, VWL 201 may be labeled "Stage 1" and dated 5 Jan. 2009; VWL 202 may be labeled "Stage 2" and dated 12 Jan. 2009; VWL 203 may be labeled "Stage 3" and dated 19 Jan. 2009; and so on through VWL 211, which may be labeled "Stage 11" and dated 16 Mar. 2009.

Referring again to FIG. 2, when made available to locate personnel, a multi-generational VWL image, such as multi-generational VWL image 200, and the information associated therewith provides precise clarity as to the order and timing of locate operations that are associated with the multiple related tickets and/or project ticket. As a result, the multi-generational VWL image of this scenario, which is created using the multi-generational VWL application 100 described herein, provides a mechanism by which excavators can clearly communicate to locate personnel information about the staged excavation, which is useful for optimally synchronizing the day-to-day activities of excavators and locate personnel.

Figure 3:
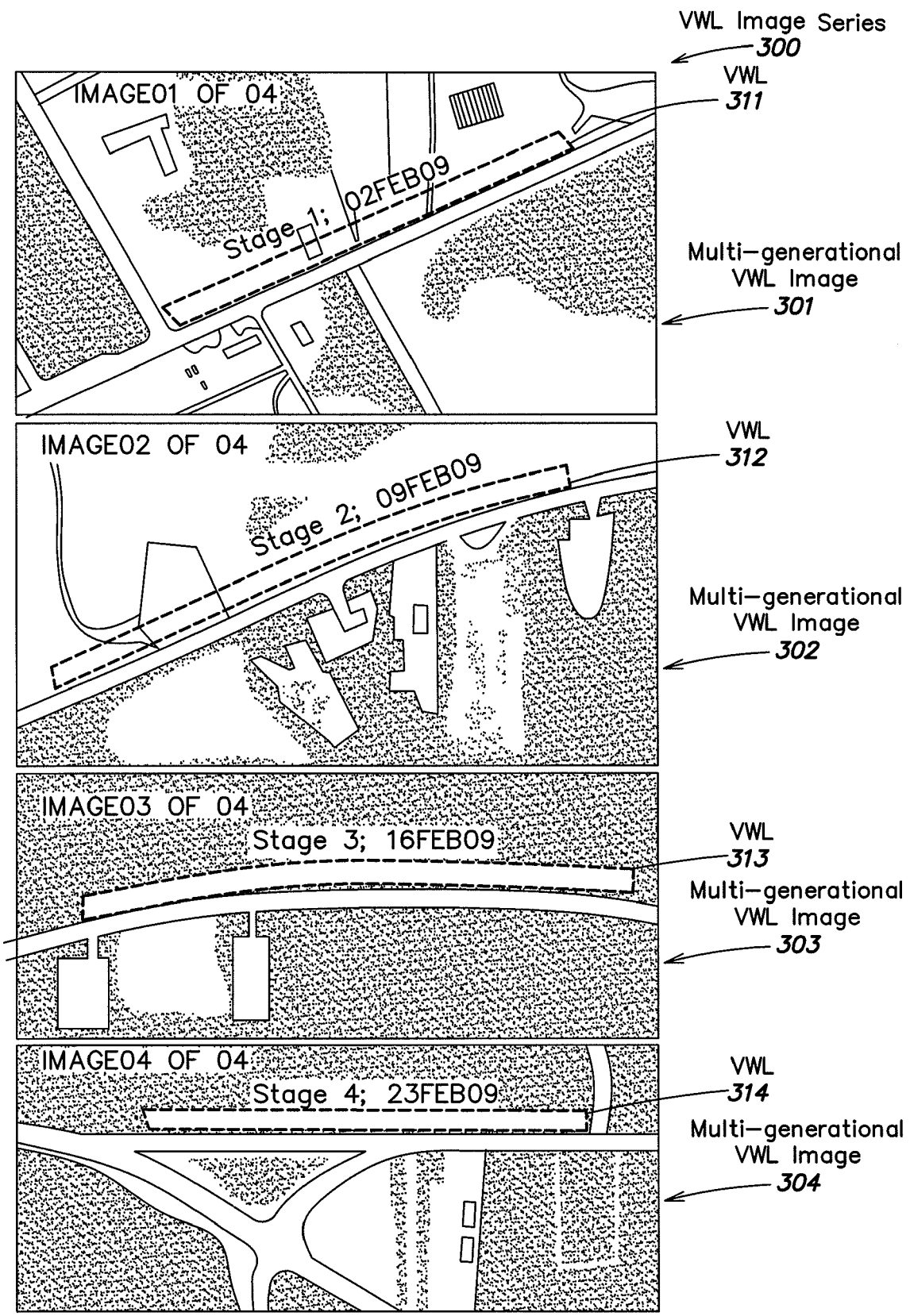
FIGS. 3 and 4 illustrate views of a virtual white lines image series, which shows the multiple image-to-multiple virtual white lines scenario of the multi-generational virtual white lines application, according to the present disclosure.
Figure 4:
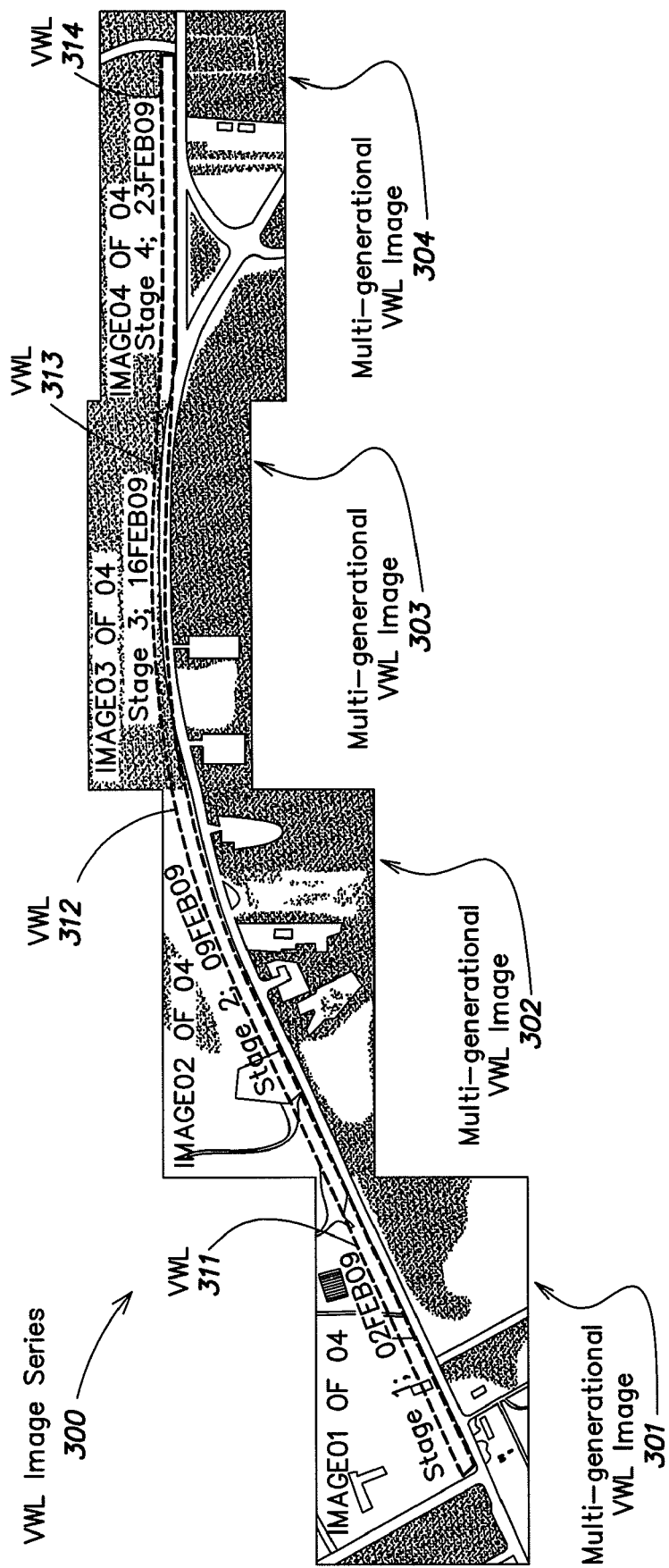

Referring to FIGS. 3 and 4, views of a VWL image series 300, which shows the "multiple image-to-multiple VWL" scenario of multi-generational VWL application 100 are presented. More specifically, FIG. 3 shows an example in which the geographic area of a certain ticket is suitably large to require it to be shown across a series of images, such as VWL image series 300. Further, each image of VWL image series 300 shows at least one set of virtual white lines. Collectively, the virtual white lines included in VWL image series 300 delimit multiple planned excavations that are staged to occur over time. For example, VWL image series 300 may include a multi-generational VWL image 301, a multi-generational VWL image 302, a multi-generational VWL image 303, and a multi-generational VWL image 304.

Additionally, multi-generational VWL image 301 shows a VWL 311, which may be the VWL for the first stage of excavation. Multi-generational VWL image 302 shows a VWL 312, which may be the VWL for the second stage of excavation. Multi-generational VWL image 303 shows a VWL 313, which may be the VWL for the third stage of excavation. Multi-generational VWL image 304 shows a VWL 314, which may be the VWL for the fourth stage of excavation. VWL 311 through VWL 314 correspond to contiguous stages of the multiple-stage project. VWL 311 through VWL 314 are created by use of VWL user interface 110 of multi-generational VWL application 100.

Further, each multi-generational VWL image and each VWL of VWL image series 300 may be automatically labeled and dated by the multigenerational VWL application 100 according to the planned excavation order and dates of the multiple related tickets and/or project ticket. For example, multi-generational VWL image 301 may be labeled "IMAGE01 OF 04" and VWL 311 may be labeled "Stage 1" and dated 2 Feb. 2009; multi-generational VWL image 302 may be labeled "IMAGE02 OF 04" and VWL 312 may be labeled "Stage 2" and dated 9 Feb. 2009; multi-generational VWL image 303 may be labeled "IMAGE03 OF 04" and VWL 313 may be labeled "Stage 3" and dated 16 Feb. 2009; and multi-generational VWL image 304 may be labeled "IMAGE04 OF 04" and VWL 314 may be labeled "Stage 4" and dated 23 Feb. 2009.

While FIG. 3 shows details of each multi-generational VWL image of VWL image series 300 separately, FIG. 4 shows multi-generational VWL images 301, 302, 303, and 304 overlaid in a fashion that shows the full scope of the staged excavations of the multiple related tickets and/or project ticket.

Referring again to FIGS. 3 and 4, when made available to locate personnel, a VWL image series, such as VWL image series 300, and the information associated therewith provides precise clarity as to the order and timing of locate operations that are associated with the multiple related tickets and/or project ticket. As a result, the VWL image series of this scenario, which is created using the multi-generational VWL application 100 described herein, provides a mechanism by which excavators can clearly communicate to locate personnel information about the staged excavation, which is useful for optimally synchronizing the day-to-day activities of excavators and locate personnel.

Referring to FIGS. 1 through 4, during the save operation of multi-generational VWL application 100, any multi-generational VWL images created therein may be converted to any standard digital image file format, such as JPG file format, and saved to an associated file system (not shown).

Figure 5:
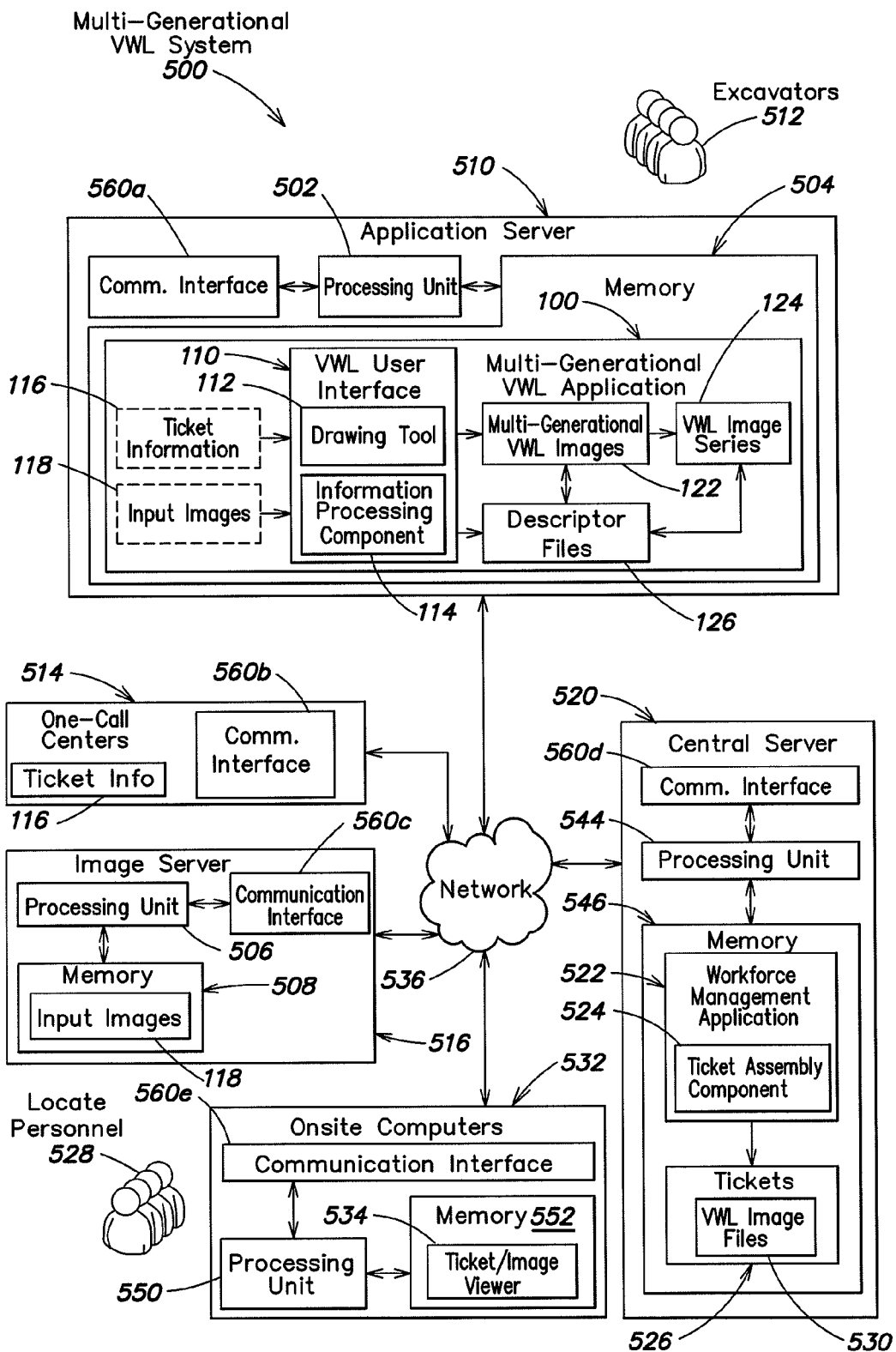
FIG. 5 illustrates a functional block diagram of a multi-generational virtual white lines system that includes the multi-generational virtual white lines application, according to the present disclosure.

Referring to FIG. 5, a functional block diagram of a multi-generational VWL system 500 that includes multi-generational VWL application 100 is presented. The multi-generational VWL system 500 described herein may include an application server 510, which includes processing unit 502 and memory 504 (memory 504 may include one or more storage media components). In one exemplary implementation, multi-generational VWL application 100, which is described with reference to FIGS. 1 through 4, is stored in memory 504 (e.g., as processor-executable instructions and data associated with execution of these instructions) and executed by processing unit 502. Application server 510 may be any application server, such as a web application server and/or web portal, by which one or more excavators 512 may access multi-generational VWL application 100 with respect to generating multi-generational virtual white lines. Application server 510 may be accessed by excavators 512 via any networked computing device (not shown). Excavators 512 may be any personnel associated with excavation companies (not shown), such as, but not limited to, individuals who are requesting and/or performing excavation activities.

Multi-generational VWL system 500 may further include one or more one-call centers 514. One-call centers 514 may be any organizations, entities, and/or systems that receive, process, and/or transmit locate requests. The locate request (or ticket) may be any communication or instruction to perform a locate operation compiled as ticket information 116. One-call centers are generally owned, controlled, or funded by underground facility owners, such as telephone companies, cable television multiple system operators, electric utilities, gas utilities, or others. One-call center operations may be managed by a non-profit entity or outsourced to a for-profit firm. Excavators, such as excavators 512, are required to notify one-call centers in advance of their excavation activities and identify through the locate request the dig area where individual excavating activities will be performed. Locate requests include information supplied by the excavator to the one-call center regarding the specific geographic location of the dig area, date, time, purpose of excavation, and so on. The locate request, in turn, requires activity from an underground facility owner (or a locate contractor) to perform a locate operation in the specified dig area pursuant to the ticket information 116.

With respect to multi-generational VWL system 500, one type of locate request that may be processed by one-call centers 514 is a project ticket that may warrant a multi-generational VWL image and/or a VWL image series associated therewith.

Multi-generational VWL system 500 may further include an image server 516. Image server 516, which includes processing unit 506 and memory 508, stores and provides input images 118. For example, image server 516 may be associated with a party that provides aerial images of geographic locations for a fee. Image server 516 is one example of an entity supplying input images 118 to multi-generational VWL application 100 residing on application server 510.

Multi-generational VWL system 500 may further include a central server 520 of, for example, a locate service provider. The central server includes processing unit 544 and memory 546, which may include one or more storage media components. A workforce management application 522 is stored on memory 546 (e.g., as processor-executable instructions) and executed by processor 544. In one exemplary implementation, the workforce management application 522 may include a ticket assembly component 524 which processes the output of the multi-generational VWL application 100 and dispatches tickets 526 to locate personnel 528. Locate personnel 528 may be, for example, locate technicians and/or quality control technicians that, for example, perform locate operations.

More specifically, workforce management application 522 of central server 520 may be used to process the locate requests, such as multiple related tickets and/or project tickets that are received from one-call centers 514, and dispatch tickets 526 to locate personnel 528 that are in the field. In particular, ticket assembly component 524 associates one or more descriptor files 126 with active tickets provided by one-call centers 514, identifies and/or assembles the multi-generational VWL image(s) 122 (in the form of image files 530) that are specified in descriptor file(s) 126 along with its corresponding ticket information, and bundles all image files and information (e.g., in some cases the descriptor file(s) themselves) in order to create tickets 526, stored in memory 546. In particular, one or more machine-readable VWL image files 530 (and optionally their associated descriptor file(s)) may be bundled with the ticket information provided by the one-call center to generate tickets 526 via ticket assembly component 524.

Tickets 526 that are dispatched from central server 520 may be received by locate personnel 528 via one or more onsite computers 532. Each onsite computer 532 may be a computer including processing unit 550 and memory 552, such as, but not limited to, a computer that is present in the vehicle that is being used by locate personnel 528. Each onsite computer 532 may be, for example, any computing device, such as portable computer, a personal computer, a tablet device, a PDA, a cellular radiotelephone, a mobile computing device, a touch-screen device, a touchpad device, or generally any device including, or connected to, a processor and a user interface. Preferably, onsite computer 532 is a portable computing device, such as laptop computer or tablet device. Residing in memory 552 of onsite computer 532, may be certain tools, such as a viewer 534, which may be executed by processing unit 550. Viewer 534 may be any viewer application that is capable of reading and displaying ticket information and/or digital images, such as VWL image files 530. In one exemplary implementation, one or more VWL image files 530 bundled in a ticket 526 may be "limited access files," e.g., encoded, encrypted, formatted, compiled and/or named in some particular fashion (e.g., having a proprietary filename extension), and the viewer 534 may be particularly designed (i.e., a "custom or proprietary" viewer) such that access to the VWL image files is limited in some manner (e.g., the image files may only be opened/viewed by the customized/proprietary viewer that recognizes the proprietary filename extension). Additional details of a method of operation and/or using multi-generational VWL system 500 are described with reference to FIGS. 6A and 6B.

A network 536 provides the communication link between any and/or all entities of multi-generational VWL system 500. For example, network 536 provides the communication network by which information may be exchanged between application server 510, one-call centers 514, image server 516, central server 520 and onsite computers 532. Network 536 may be, for example, any local area network (LAN) and/or wide area network (WAN) for connecting to the Internet.

In order to connect to network 536, each entity of multi-generational VWL system 500 includes a communication interface. For example, the respective communication interfaces 560*a-e* of application server 510, one-call centers 514, image server 516, central server 520 and onsite computers 532 may be any wired and/or wireless communication interface by which information may be exchanged between any entities of multi-generational VWL system 500. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetootht technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Multi-generational VWL system 500 is not limited to the types and numbers of entities that are shown in FIG. 5. Any types and numbers of entities that may be useful in underground facilities locate applications may be included in multi-generational VWL system 500. Further, the distribution of storage and processing of data shown in FIG. 5 is merely exemplary, as described below.

For example, in another alternative implementation, rather than employing central server 520 in the VWL system 500, a one-call center 514 may include and maintain the ticket assembly component 524 (shown in FIG. 5 as part of the workforce management application 522), and may receive from the multi-generational VWL application 100 one or more of multi-generational VWL images 122, VWL image series 124 (e.g., in the form of image files 530) and/or descriptor file(s) 126 to be associated with ticket information 116.

In this example, excavators may initiate locate requests with the one-call center 514 and provide ticket information 116. The one-call center 514 may in turn pass the ticket information 116 to the VWL application 100, and re-direct the excavator to the VWL application 100 for creation of one or more VWL images 122 and/or image series 124. Upon completion of the VWL images, the VWL application 100 transmits back to the ticket assembly component 524 resident at the one-call center 514 one or more image files 530 and descriptor file(s) 126, which the ticket assembly component 524 then bundles with the ticket information 116 prior to dispatching tickets 526 to locate personnel 528.

It should be appreciated that the methods described above in connection with ticket assembly (i.e., bundling of ticket information, one or more VWL images, and optionally one or more descriptor files) and dispatch of assembled tickets may be employed for excavation projects involving a single dig area as well as multi-generational staged excavation projects. For single-stage projects in which only one VWL image is created to identify a single dig area, a VWL application (e.g., as described in U.S. patent application Ser. Nos. 12/366,853 and 12/050,055) may provide to the ticket assembly component (wherever resident) a VWL image file and in some cases a descriptor file (e.g., an XML file), and/or metadata forming part of the VWL image file, including information associated with the VWL image. Examples of information that may be included as metadata in the VWL image file or included in the descriptor file may include, but is not limited to, date and time information indicating when the VWL image was created, an identifier for the creator of the VWL image (e.g., the excavator), location information (geo-coordinates) for the VWL indicating the dig area (dig area indicators), provider information relating to a service (e.g., the image server 516) for the underlying image on which a VWL is created, latitude/longitude and/or altitude information relating to the underlying image, and the like. As in the multi-generational VWL implementation described above, ticket assembly component bundles the VWL image and optionally the metadata and/or descriptor file with the ticket information so as to compile a ticket for dispatching to locate personnel.

In some instances, for either single-stage or multi-generational staged excavation projects, it may be desirable for a single entity or a limited number of entities to retain control over the VWL image file(s) 530 and any associated metadata and/or descriptor file(s). For example, it may be desirable for the entity that provides access to a VWL creation application (e.g., the multi-generational VWL application 100) and has initial control of one or more created VWL images (e.g., application server 510) to retain control of such VWL images. One potential benefit of retaining control of the VWL image(s) once created is avoiding unauthorized edits to or unauthorized use of the image(s).

According to one example, a "controlling" entity that provides access to a VWL creation application (e.g., the multi-generational VWL application 100) retains control of one or more created images, but allows other entities to access the images in some instances in a limited manner. For example, the controlling entity may provide a link (e.g., a hyperlink) to one or more VWL images (e.g., via an e-mail) or otherwise provide an interface allowing the VWL image(s) to be accessed (e.g., via a customized or proprietary image viewing application). To maintain the integrity of the VWL image(s), the application providing access to the VWL image(s) may prohibit copying of, saving of, or writing to the images. For example, the VWL image may be viewable only using a corresponding image file viewer that allows limited access to the VWL image. In particular, copy, save and/or write access to the VWL image may be prohibited. In these and other respects discussed below, one or more VWL image files may be stored and/or transmitted as "limited access files."

The VWL image may, for example, be transmitted to a party associated with the at least one underground facility with the corresponding image file viewer so that the party may view the VWL image. For example, an executable file comprising the VWL image and image file viewer may be transmitted (e.g., a customized image viewer 534 may be transmitted to one or more onsite computers 532). Alternatively, the image file viewer may be downloaded/installed separately, e.g., from a website of the controlling entity, or the VWL image may be viewed using an image file viewer stored and executed on a server of the controlling entity.

In one implementation, the controlling entity may allow access to the VWL image(s) only when a certain condition or conditions are met. For example, the controlling entity may require a password protected log-in procedure for access to the VWL image(s). In particular, the image file viewer may require a password to permit access to the VWL image. As another example, the controlling entity may require acceptance of certain terms and/or conditions to permit access to the VWL image. According to one implementation, the image file viewer may be programmed to require an indication of acceptance of terms and/or conditions prior to permitting access to the VWL image. According to yet another example, the controlling entity may charge a fee for permitting a third party to access one or more VWL images, such as a per-transaction fee or a subscription fee.

To prevent access to the VWL image unless or until a condition or conditions are met, the VWL image may be encrypted and require decryption to be readable. A corresponding image file viewer may be required to decrypt the VWL image. The VWL image and/or the corresponding image file viewer may also or alternatively be proprietary, and may have a format specific to the controlling entity. The image file viewer may optionally be programmed to determine whether an updated version of the image file viewer is available. For example, the image file viewer may interrogate information associated with the VWL image to determine a corresponding version of the image file viewer. If an updated version is found, the viewer may prompt the user to upgrade the application or otherwise facilitate an update.

The VWL image may be transmitted in a variety of different formats. For example, the VWL image may be transmitted as an image including virtual white lines thereon. Alternatively, the VWL image may be transmitted as a base image with associated metadata and/or a separate file (e.g., an XML file) including information that allows virtual white lines to be rendered on or in connection with the base image. Such information may comprise geographic coordinates specifying the virtual white lines to be displayed on the base image. The information included in the metadata and/or separate file may also specify access permissions for the virtual white lines. For example, in the case where the information that allows virtual white lines to be rendered relates to a plurality of dig sites, virtual white line information for one or more dig sites may have restricted access such that the corresponding virtual white lines are not rendered unless certain access conditions are met.

Since the workforce management application 522 may require access to one or more VWL image file(s) 530 to assemble, attach or otherwise integrate the image file(s) with ticket information, it may be desirable in some implementations to store and execute the workforce management application 522 on the application server 510, which facilitates creation of one or more VWL images. Alternatively, the workforce management application 522 may be stored and executed on the central server 520 or at one-call centers 514, but the VWL image(s) may be stored remotely. In this case, the bundling performed by the ticket assembly component (wherever resident) may involve, e.g., bundling the information of tickets 526 with a link to one or more VWL images or other information specifying or permitting access to the VWL image(s). According to another arrangement, the central server 520 or the one-call centers 514 may control one or more VWL images by storing the VWL image(s) and also storing and executing the workforce management application 522.

Figure 6A:
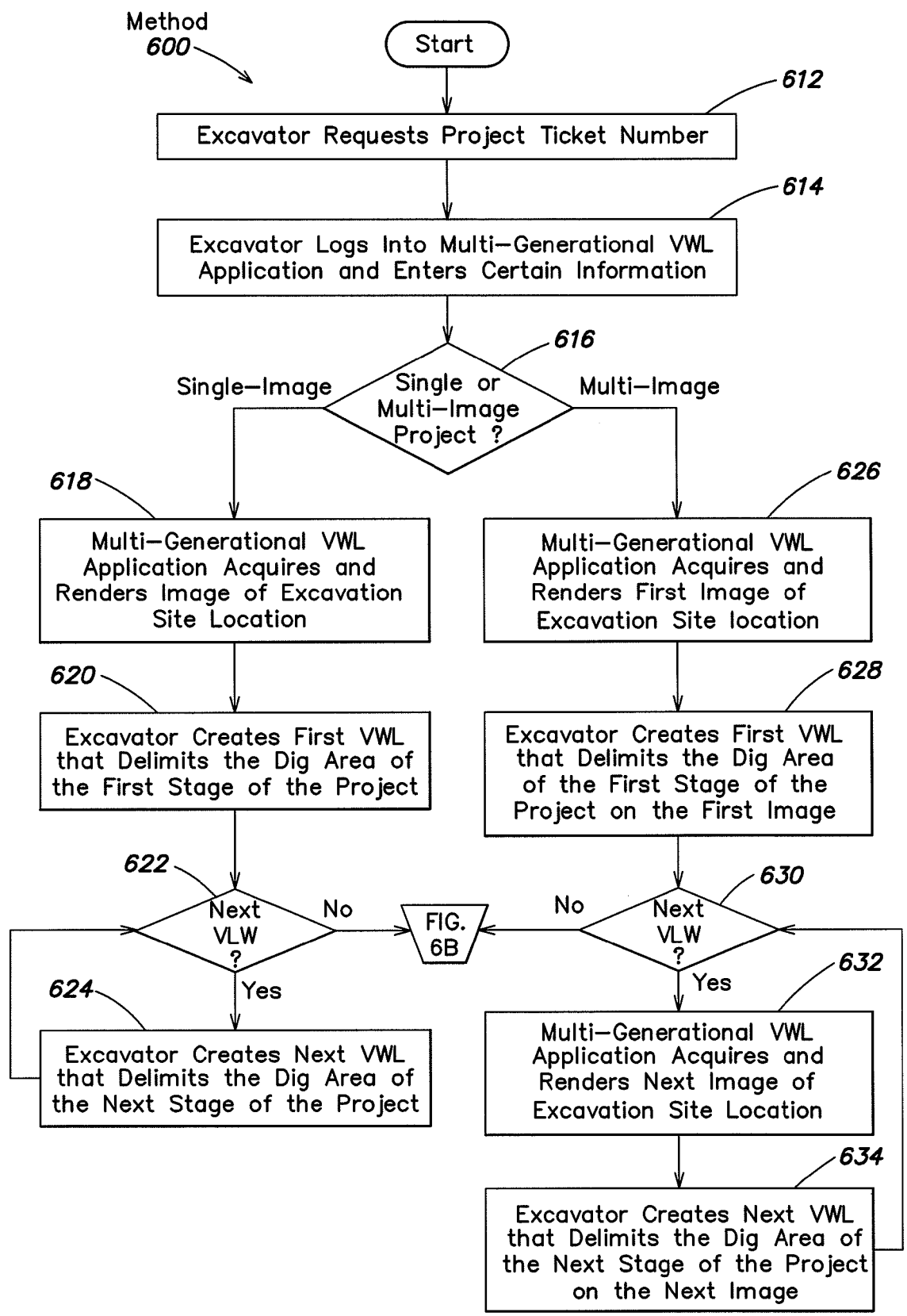
FIGS. 6A and 6B illustrate a flow diagram of an example of a method of operation and/or of using the multi-generational virtual white lines system, according to the present disclosure.
Figure 6B:
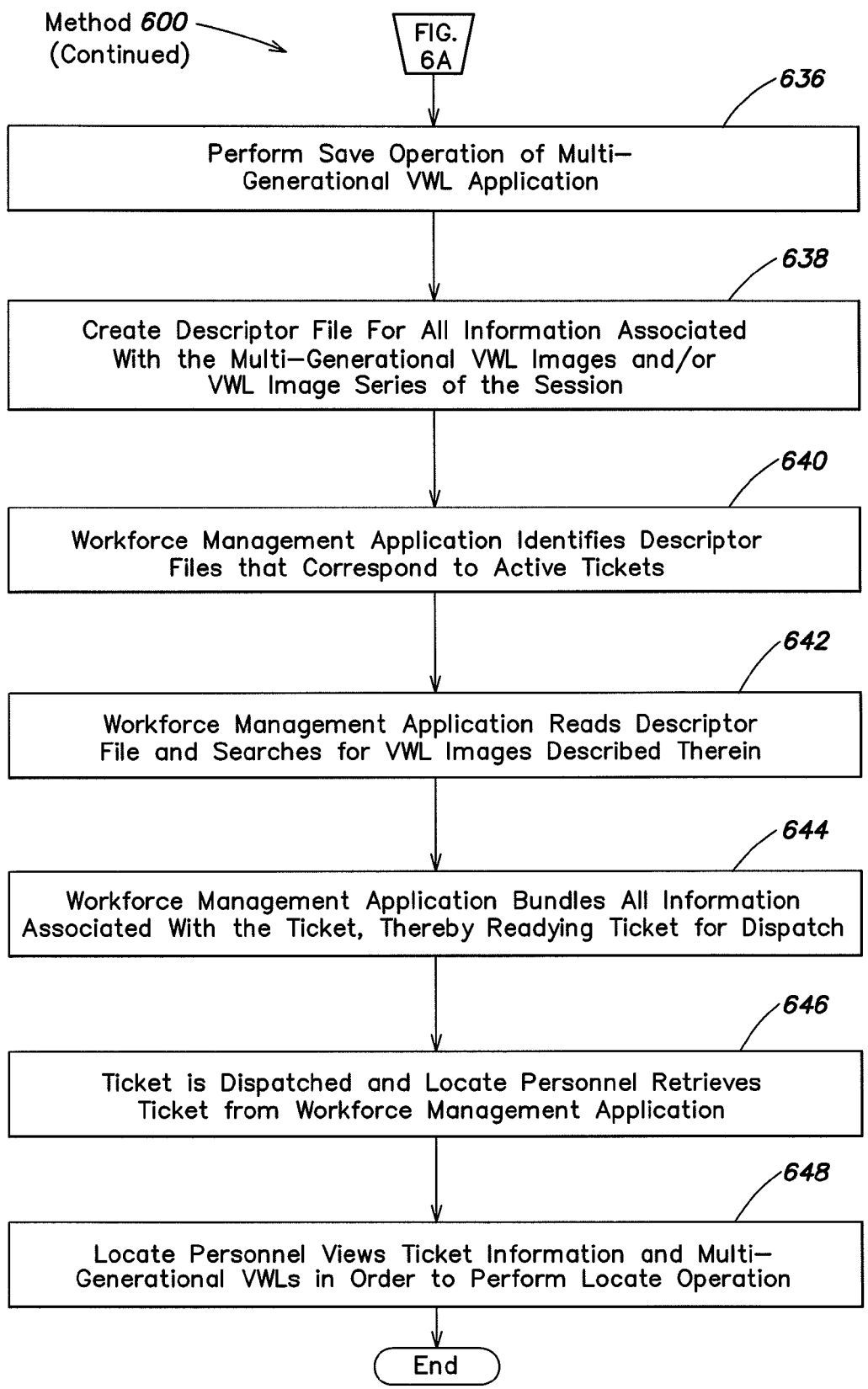

Referring to FIGS. 6A and 6B, a flow diagram of an example of a method 600 of operation and/or of using multi-generational VWL system 500 is presented. Method 600 may include, but is not limited to, the following steps, which are not limited to any order.

At step 612, a certain excavator 512 requests a ticket number from any controlling entity. For example, the excavator 512 calls and/or accesses a web portal of the one-call center 514 and requests, for example, a project ticket number because the planned excavation is related to a project wherein excavation is to be performed in multiple stages over time (e.g., over several days, weeks, and/or months).

At step 614, the certain excavator 512 logs into multi-generational VWL application 100 and enters certain information. For example, using the Internet browser of any networked computer, the excavator 512 logs into multi-generational VWL application 100 at application server 510 in order to access VWL user interface 110 and certain information, such as, but not limited to, the excavator's name, excavation company name, excavation company location, ticket number, and the dig area address and/or other location information. Alternatively, the excavator may enter this information via the one-call center web portal, and the one-call center may redirect the excavator to the multi-generational VWL application and pass on to the application some or all of the information provided by the excavator (e.g., as an XML file). Information processing component 114 temporarily caches this information in order to later associate this information as may be necessary or desirable with multi-generational VWL images 122 and/or VWL image series 124 that are created by multi-generational VWL application 100.

At decision step 616, based on the address and/or other location information of the proposed dig area, it may be determined whether a single input image 118 from image server 516 is needed or multiple input images 118 are needed in order to render the fill scope of the multiple related tickets and/or project ticket. If a single input image 118 only is needed to fully render the project (i.e., the "one image-to-multiple VWL" scenario), method 600 proceeds to step 618. However, if multiple input images 118 are needed to fully render the project (i.e., the "multiple image-to-multiple VWL" scenario), method 600 proceeds to step 626.

At step 618, multi-generational VWL application 100 acquires and renders an input image 118, which may be an aerial image, of the excavation site location. In one example, using VWL user interface 110, the excavator 512 may enter the address and/or other location information (e.g., latitude/longitude coordinates) of the proposed dig area and multi-generational VWL application 100 automatically queries image server 516 for the corresponding input image 118 which is read into the application and rendered in drawing tool 112. In another example, multi-generational VWL application 100 provides a mechanism by which the excavator 512 may view and pan over an aerial map of a region and then manually identify the location of the proposed dig area. Once manually identified, the corresponding input image 118 is read into the application and rendered in drawing tool 112. By way of example and referring again to FIG. 2, an input image 118, such as multi-generational VWL image 200, is read into the application and rendered in drawing tool 112.

At step 620, the excavator 512 creates the first virtual white line that delimits the dig area of the first stage of the project. By way of example and referring again to FIG. 2, the excavator 512 creates VWL 201 on multi-generational VWL image 200 using drawing tool 112, which delimits the dig area of the first stage of the project. Additionally, the excavator 512 is prompted for or otherwise enters information that is automatically associated with VWL 201. For example, the excavator 512 enters the stage number (e.g., stage 1) and the stage date (e.g., 5 Jan. 2009), which may be superimposed on multi-generational VWL image 200 at VWL 201.

At decision step 622, the excavator 512 is prompted or otherwise indicates whether another virtual white line is to be created. If yes, method 600 proceeds to step 624. If no, method 600 proceeds to step 636.

At step 624, the excavator 512 creates the next virtual white line that delimits the dig area of the next stage of the project. By way of example and referring again to FIG. 2, the excavator 512 creates the next virtual white line, such as VWL 202 (then VWL 203, then VWL 204, and so on) on multi-generational VWL image 200 using drawing tool 112, which delimits the dig area of the next stage of the project. Additionally, the excavator 512 is prompted for or otherwise enters information that is automatically associated with the next virtual white line, such as VWL 202. For example, for VWL 202, the excavator 512 enters the stage number (e.g., stage 2) and the stage date (e.g., 12 Jan. 2009), which may be superimposed on multi-generational VWL image 200 at VWL 202. Method 600 returns to step 622.

At step 626, multi-generational VWL application 100 acquires and renders the first input image 118, which may be an aerial image, of the excavation site location. In one example, using VWL user interface 110, the excavator 512 may enter the address and/or other location information (e.g., latitude/longitude coordinates) of the first proposed dig area and multi-generational VWL application 100 automatically queries image server 516 for the corresponding input image 118 which is read into the application and rendered in drawing tool 112. In another example, multi-generational VWL application 100 provides a mechanism by which the excavator 512 may view and pan over an aerial map of a region and then manually identify the location of the proposed dig area. Once manually identified, the corresponding input image 118 is read into the application and rendered in drawing tool 112. By way of example and referring again to FIGS. 3 and 4, an input image 118, such as multi-generational VWL image 301, is read into the application and rendered in drawing tool 112.

At step 628, the excavator 512 creates the first virtual white line that delimits the dig area of the first stage of the project on the first input image 118. By way of example and referring again to FIGS. 3 and 4, the excavator 512 creates VWL 311 on multi-generational VWL image 301 using drawing tool 112, which delimits the dig area of the first stage of the project. Additionally, the excavator 512 is prompted for or otherwise enters information that is automatically associated with VWL 311. For example, the excavator 512 enters the stage number (e.g., stage 1) and the stage date (e.g., 2 Feb. 2009), which may be superimposed on multi-generational VWL image 301 at VWL 311.

At decision step 630, the excavator 512 is prompted or otherwise indicates whether another virtual white line is to be created. If yes, method 600 proceeds to step 632. If no, the VWL image series is complete and method 600 proceeds to step 636.

At step 632, multi-generational VWL application 100 acquires and renders the next input image 118, which may be an aerial image, of the excavation site location. In one example, using VWL user interface 110, the excavator 512 may enter the address and/or other location information (e.g., latitude/longitude coordinates) of the next proposed dig area and multi-generational VWL application 100 automatically queries image server 516 for the corresponding input image 118 which is read into the application and rendered in drawing tool 112. In another example, multi-generational VWL application 100 provides a mechanism by which the excavator 512 may view and pan over an aerial map of a region and then manually identify the location of the next proposed dig area. Once manually identified, the corresponding input image 118 is read into the application and rendered in drawing tool 112. By way of example and referring again to FIGS. 3 and 4, an input image 118, such as multi-generational VWL image 302 (then multi-generational VWL image 303, then multi-generational VWL image 304), is read into the application and rendered in drawing tool 112.

At step 634, the excavator 512 creates the next virtual white line that delimits the dig area of the next stage of the project on the next input image 118. By way of example and referring again to FIGS. 3 and 4, the excavator 512 creates the next virtual white line, such as VWL 312 (then VWL 313, then VWL 314) on multi-generational VWL image 302 (then multi-generational VWL image 303, then multi-generational VWL image 304) using drawing tool 112, which delimits the dig area of the next stage of the project. Additionally, the excavator 512 is prompted for or otherwise enters information that is automatically associated with the next virtual white line, such as VWL 312. For example, for VWL 312, the excavator 512 enters the stage number (e.g., stage 2) and the stage date (e.g., 9 Feb. 2009), which may be superimposed on multi-generational VWL image 302 at VWL 312. The transition from one multi-generational VWL image to the next may be assisted via geo-coding or other geographical identification metadata therein for "stitching" the images together in a contiguous fashion. Method 600 returns to step 630.

At step 636 shown in FIG. 6B, a save operation of multi-generational VWL application 100 is performed. In particular, one or more virtual white lines, one or more multi-generational VWL images, one or more VWL image series, and/or other information is saved in multi-generational VWL application 100. For example, the excavator 512 may initiate a save operation by selecting a SAVE button of VWL user interface 110 in order to save the contents of the session at application server 510 and/or central server 520. In particular, all of the multi-generational VWL images showing the multi-generational virtual white lines that delimit or otherwise indicate the respective stages of the multiple related tickets and/or project ticket are saved as standard machine-readable image files, such as JPG files, which are hereafter referred to as VWL image files. During the save operation, the excavator 512 may be prompted to enter certain information. For example, the excavator 512 may be prompted to enter the ticket number that was provided by the one-call center 514 at step 612. Additionally, in order to log the one-call center 514 for this ticket, the excavator 512 may be prompted to select the originating one-call center 514.

At step 638, multi-generational VWL application 100 creates one or more descriptor files 126 for all information associated with the multi-generational VWL images and/or VWL image series of the session. For example, when each multi-generational VWL image and/or VWL image series is saved, a corresponding descriptor file 126 (e.g., corresponding XML file) is created that includes information about the multi-generational VWL images and/or VWL image series, such as multi-generational VWL image 200 of FIG. 2 and/or VWL image series 300 of FIGS. 3 and 4. For example and with respect to multiple-stage excavation projects, each descriptor file 126 may include the ticket number, the name of multi-generational VWL image, the name of the VWL image series, the stage number and stage date with respect to each virtual white line of the multiple related tickets and/or project ticket, and other information as discussed above.

At step 640, ticket assembly component 524 queries the file directory of application server 510 in order to identify descriptor files 126 that correspond to active tickets of one-call centers 514. This may be accomplished by matching the ticket number information of descriptor files 126 to active tickets of one-call centers 514.

At step 642, once a descriptor file 126 that corresponds to an active ticket is identified, ticket assembly component 524 reads the identified descriptor file 126 and searches for the VWL image files 530 of the multi-generational VWL images that are specified therein for the ticket of interest. In one example and referring to FIG. 2, multi-generational VWL image 200 may be specified in the identified descriptor file 126. In another example and referring to FIGS. 3 and 4, multi-generational VWL images 301, 302, 303, and 304 of VWL image series 300 may be specified in the identified descriptor file 126.

At step 644, ticket assembly component 524 bundles the multi-generational VWL images (in the form of VWL image files 530) that are specified in the identified descriptor file 126 along with its corresponding ticket information in order to create a certain ticket 526. In one example and referring to FIG. 2, a VWL image file 530 of multi-generational VWL image 200 may be bundled along with its corresponding ticket information in order to create a certain ticket 526. In another example and referring to FIGS. 3 and 4, VWL image files 530 of multi-generational VWL images 301, 302, 303, and 304 of VWL image series 300 may be bundled in the correct order along with the corresponding ticket information in order to create a certain ticket 526.

According to one example, the ticket assembly component 524 forms a ticket bundle by assembling a file including the at least one image and the ticket information. Alternatively, the ticket assembly component 524 may form the ticket bundle by associating a file including the at least one image and a file including the ticket information. The ticket bundle need not include the actual at least one image. Instead, the ticket bundle may comprise information specifying or permitting access to the at least one image (e.g., a link to the at least one image). Thus, the ticket bundle may comprise a file including the ticket information and a link (e.g., a hyperlink) to the at least one image. In some implementations, the ticket bundle may include one or more descriptor files themselves.

At step 646, one or more tickets 526 are dispatched and locate personnel 528 retrieve the one or more tickets 526 (e.g., from central server 520) via their respective onsite computers 532. For example, the tickets 526 may be electronically transmitted to the locate personnel 528 from the central server 520. Alternatively, the tickets 526 may be made accessible to the locate personnel 528 on the central server 520. In one example and referring to FIG. 2, a certain locate personnel 528 retrieves a ticket 526 that includes the VWL image file 530 of multi-generational VWL image 200 along with its corresponding ticket information. In another example and referring to FIGS. 3 and 4, a certain locate personnel 528 retrieves a ticket 526 that includes the VWL image files 530 of multi-generational VWL images 301, 302, 303, and 304 of VWL image series 300 along with the corresponding ticket information. According to yet another example, the ticket may include a link to the one or more VWL images or other information specifying or permitting access to the one or more VWL images, rather than including the image or images themselves. As noted above, custom viewers also may be employed by ticket recipients to provide limited access to VWL images.

At step 648, locate personnel 528 views the ticket information and the multi-generational VWLs in order to perform a locate operation. In one example and referring to FIG. 2, a certain locate personnel 528 uses viewer 534 to view information of ticket 526 and to view VWL 201 through 211 of multi-generational VWL image 200 in order to perform the locate operation according to the order and date specified thereon. In another example and referring to FIGS. 3 and 4, a certain locate personnel 528 uses viewer 534 to view information of ticket 526 and to view VWL 311 of multi-generational VWL image 301, VWL 312 of multi-generational VWL image 302, VWL 313 of multi-generational VWL image 303, and VWL 314 of multi-generational VWL image 304 in order to perform the locate operation according to the order and date specified thereon.

It should be appreciate that while the foregoing example relates to a method of operation and/or of using a multi-generational VWL system, the method may also apply to single stage projects and single VWL image files.

In summary, multi-generational VWL application 100, multi-generational VWL system 500, and/or method 600 may provide improved tools for clearly documenting plans for staged excavation with respect to, for example, multiple related tickets and/or project tickets that is not otherwise available using current processes.

Further, multi-generational VWL application 100, multi-generational VWL system 500, and/or method 600 may provide improved communication mechanisms between excavators and locate personnel for synchronizing staged excavation activities and locate operations that are not otherwise available using current processes.

Yet further, because of the improved communication mechanisms between excavators and locate personnel, multi-generational VWL application 100, multi-generational VWL system 500, and/or method 600 may provide improved operating efficiency for both excavation companies and locate service providers. Still further, because of the improved tools and communication mechanisms between excavators and locate personnel, multi-generational VWL application 100, multi-generational VWL system 500, and/or method 600 may reduce or entirely eliminate the uncertainty for excavators about the status and/or quality of locate operations, which may reduce or entirely eliminate the risk of damage to underground facilities.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for facilitating detection of a presence or an absence of at least one underground facility within a dig area, wherein at least a portion of the dig area is planned to be excavated or disturbed during excavation activities, the apparatus comprising:
   a communication interface;
   a memory to store processor-executable instructions; and
   a processing unit coupled to the communication interface and the memory, wherein upon execution of the processor-executable instructions by the processing unit, the processing unit:
      digitally searches the memory to identify a descriptor file corresponding to at least one ticket, the at least one ticket constituting an instruction to perform a locate operation to detect the presence or the absence of the at least one underground facility within the dig area, wherein the descriptor file comprises first information identifying the at least one ticket and wherein the descriptor file comprises second information identifying at least one image corresponding to the at least one ticket;
      based on identifying information in the descriptor file, identifies the at least one image corresponding to the at least one ticket, the at least one image comprising at least one indication of at least one dig area, wherein:
         the at least one indication comprises at least one marking delimiting the at least one dig area;
         the at least one dig area comprises a plurality of dig areas;
         the at least one image includes a plurality of images corresponding to the at least one ticket, each image of the plurality of images including one indication of the at least one indication; and
         the one indication in each image includes the at least one marking delimiting one dig area of the plurality of dig areas, such that different images of the plurality of images corresponding to the at least one ticket indicate different dig areas of the plurality of dig areas;
      automatically labels and dates the one indication in each image including the at least one marking delimiting one dig area of the plurality of dig areas, according to planned excavation stages and dates for the plurality of dig areas specified by the at least one ticket;
      electronically bundles the at least one image with ticket information from the at least one ticket to generate a ticket bundle; and
      provides the generated ticket bundle to at least one party associated with the at least one underground facility, to process the ticket bundle to facilitate the detection of the presence or the absence of the at least one underground facility.

2. The apparatus of claim 1, wherein the processor electronically transmits the ticket bundle, via the communication interface, to the at least one party associated with the at least one underground facility.

3. The apparatus of claim 1, wherein the processor provides electronic access to the ticket bundle, to the at least one party associated with the at least one underground facility, via the communication interface.

4. The apparatus of claim 1, wherein the information identifying the ticket comprises a ticket number.

5. The apparatus of claim 1, wherein the information identifying the at least one image corresponding to the ticket comprises an image name.

6. The apparatus of claim 1, wherein the descriptor file comprises an XML file.

7. The apparatus of claim 1, wherein the ticket bundle comprises a file including the at least one image and the ticket information.

8. The apparatus of claim 1, wherein the ticket bundle comprises associated files including the at least one image and the ticket information.

9. The apparatus of claim 1, wherein the ticket bundle comprises a file including the ticket information and information specifying or permitting access to the at least one image.

10. The apparatus of claim 9, wherein the information specifying or permitting access to the at least one image comprises a link to the at least one image.

11. At least one non-transitory computer-readable medium encoded with instructions that, when executed by at least one processing unit, perform a method for facilitating detection of a presence or an absence of at least one underground facility within a dig area, wherein at least a portion of the dig area is planned to be excavated or disturbed during excavation activities, the method comprising:
   A) digitally searching a memory to identify a descriptor file corresponding to at least one ticket, the at least one ticket constituting an instruction to perform a locate operation to detect the presence or the absence of the at least one underground facility within the dig area, wherein the descriptor file comprises first information identifying the at least one ticket and second information identifying the at least one image corresponding to the at least one ticket;
   B) based on identifying information in the descriptor file, digitally searching for the at least one image corresponding to the at least one ticket, the at least one image comprising at least one indication of at least one dig area, wherein:
      the at least one indication comprises at least one marking delimiting the at least one dig area;
      the at least one dig area comprises a plurality of dig areas;
      the at least one image includes a plurality of images corresponding to the at least one ticket, each image of the plurality of images including one indication of the at least one indication; and
      the one indication in each image includes the at least one marking delimiting one dig area of the plurality of dig areas, such that different images of the plurality of images corresponding to the at least one ticket indicate different dig areas of the plurality of dig areas;
   B1) automatically labeling and dating the one indication in each image including the at least one marking delimiting one dig area of the plurality of dig areas, according to planned excavation stages and dates for the plurality of dig areas specified by the at least one ticket;

C) electronically bundling the at least one image with ticket information from the at least one ticket to generate a ticket bundle; and D) providing the generated ticket bundle to at least one party associated with the at least one underground facility, to process the ticket bundle so as to facilitate the detection of the presence or the absence of the at least one underground facility.

12. The at least one computer-readable medium of claim 11, wherein the information identifying the ticket comprises a ticket number.

13. The at least one computer-readable medium of claim 11, wherein D) comprises electronically transmitting the ticket bundle to at least one party associated with the at least one underground facility.

14. A method for facilitating detection of a presence or an absence of at least one underground facility within at least one dig area, wherein at least a portion of the at least one dig areas is planned to be excavated or disturbed during excavation activities, the method comprising:

A) digitally searching a memory to identify a descriptor file corresponding to at least one ticket, the at least one ticket constituting an instruction to perform a locate operation to detect the presence or the absence of the at least one underground facility within the dig area, wherein the descriptor file comprises first information identifying the at least one ticket and second information identifying the at least one image corresponding to the at least one ticket;

B) based on identifying information in the descriptor file, digitally searching for the at least one image corresponding to the at least one ticket, the at least one image comprising at least one indication of at least one dig area, wherein:

the at least one indication comprises at least one marking delimiting the at least one dig area;

the at least one dig area comprises a plurality of dig areas;

the at least one image includes a plurality of images corresponding to the at least one ticket, each image of the plurality of images including one indication of the at least one indication; and the one indication in each image includes the at least one marking delimiting one dig area of the plurality of dig areas, such that different images of the plurality of images corresponding to the at least one ticket indicate different dig areas of the plurality of dig areas;

B1) automatically labeling and dating the one indication in each image including the at least one marking delimiting one dig area of the plurality of dig areas, according to planned excavation stages and dates for the plurality of dig areas specified by the at least one ticket;

C) electronically bundling the at least one image with ticket information from the at least one ticket to generate a ticket bundle; and D) providing the generated ticket bundle to at least one party associated with the at least one underground facility, to process the ticket bundle so as to facilitate the detection of the presence or the absence of the at least one underground facility.

15. An apparatus for facilitating detection of a presence or an absence of at least one underground facility within a dig area, wherein at least a portion of the dig area is planned to be excavated or disturbed during excavation activities, the apparatus comprising:

a communication interface;

a memory to store processor-executable instructions; and a processing unit coupled to the communication interface and the memory, wherein upon execution of the processor-executable instructions by the processing unit, the processing unit:

electronically receives, via the communication interface, at least one image corresponding to at least one ticket or at least one link to the at least one image, the at least one image comprising at least one indication of at least one dig area, and data relating to the at least one image, wherein:

the at least one indication comprises at least one marking delimiting the at least one dig area;

the at least one dig area comprises a plurality of dig areas;

the at least one image includes a plurality of images corresponding to the at least one ticket, each image of the plurality of images including one indication of the at least one indication; and the one indication in each image includes a label and a date according to planned excavation stages and dates for the plurality of dig areas specified by the at least one ticket, the one indication in each image further including the at least one marking delimiting one dig area of the plurality of dig areas, such that different images of the plurality of images corresponding to the at least one ticket indicate different dig areas of the plurality of dig areas;

based on the data relating to the at least one image, identifies ticket information in the memory corresponding to the at least one ticket;

electronically bundles the at least one image or the at least one link with the ticket information to generate a ticket bundle; and provides the generated ticket bundle, via the communication interface, to at least one party associated with the at least one underground facility, to process the ticket bundle so as to facilitate the detection of the presence or the absence of the at least one underground facility.

16. The apparatus of claim 15, wherein the processor electronically transmits the ticket bundle, via the communication interface, to the at least one party associated with the at least one underground facility.

17. The apparatus of claim 16, wherein the processor provides electronic access to the ticket bundle, to the at least one party associated with the at least one underground facility, via the communication interface.

18. The apparatus of claim 15, wherein the processing unit electronically receives at least one image corresponding to at least one ticket.

19. The apparatus of claim 15, wherein the at least one image is encrypted so as to be viewable only using a corresponding encrypted image file viewer.

20. The apparatus of claim 19, wherein the processing unit electronically bundles the at least one image and the ticket information with the corresponding encrypted image file viewer to generate the ticket bundle.

21. The apparatus of claim 19, wherein the encrypted image file viewer prevents write access to the at least one image.

22. The apparatus of claim 19, wherein the encrypted image file viewer prevents save access to the at least one image.

23. The apparatus of claim 19, wherein the encrypted image file viewer prevents copy access to the at least one image.

24. The apparatus of claim 18, wherein the at least one image is password protected.

25. The apparatus of claim 18, wherein the at least one image is access limited.

26. The apparatus of claim 15, wherein the processing unit electronically receives at least one link to the at least one image.

27. The apparatus of claim 15, wherein the data relating to the at least one image comprises metadata associated with the at least one image.

28. The apparatus of claim 15, wherein the data relating to the at least one image comprises a descriptor file.

29. The apparatus of claim 28, wherein the descriptor file comprises an XML file.

30. The apparatus of claim 15, wherein the data relating to the at least one image comprises information identifying the ticket.

31. The apparatus of claim 15, wherein the data relating to the at least one image comprises a ticket number.

32. At least one non-transitory computer-readable medium encoded with instructions that, when executed by at least one processing unit, perform a method for facilitating detection of a presence or an absence of at least one underground facility within a dig area, wherein at least a portion of the dig area is planned to be excavated or disturbed during excavation activities, the method comprising:
A) electronically receiving at least one image corresponding to at least one ticket or at least one link to the at least one image, the at least one image comprising at least one indication of at least one dig area, and data relating to the at least one image, wherein:
the at least one indication comprises at least one marking delimiting the at least one dig area;
the at least one dig area comprises a plurality of dig areas;
the at least one image includes a plurality of images corresponding to the at least one ticket, each image of the plurality of images including one indication of the at least one indication; and
the one indication in each image includes a label and a date according to planned excavation stages and dates for the plurality of dig areas specified by the at least one ticket, the one indication in each image further including the at least one marking delimiting one dig area of the plurality of dig areas, such that different images of the plurality of images corresponding to the at least one ticket indicate different dig areas of the plurality of dig areas;
B) based on the data relating to the at least one image, identifying ticket information corresponding to the at least one ticket;
C) electronically bundling the at least one image or the at least one link with the ticket information to generate a ticket bundle; and
D) providing the generated ticket bundle to at least one party associated with the at least one underground facility, to process the ticket bundle so as to facilitate the detection of the presence or the absence of the at least one underground facility.

33. A method for facilitating detection of a presence or an absence of at least one underground facility within at least one dig area, wherein at least a portion of the at least one dig areas is planned to be excavated or disturbed during excavation activities, the method comprising:
A) receiving at least one image corresponding to at least one ticket or at least one link to the at least one image, the at least one image comprising at least one indication of at least one dig area, and data relating to the at least one image, wherein:
the at least one indication comprises at least one marking delimiting the at least one dig area;
the at least one dig area comprises a plurality of dig areas;
the at least one image includes a plurality of images corresponding to the at least one ticket, each image of the plurality of images including one indication of the at least one indication; and
the one indication in each image includes a label and a date according to planned excavation stages and dates for the plurality of dig areas specified by the at least one ticket, the one indication in each image further including the at least one marking delimiting one dig area of the plurality of dig areas, such that different images of the plurality of images corresponding to the at least one ticket indicate different dig areas of the plurality of dig areas;
B) based on the data relating to the at least one image, identifying ticket information corresponding to the at least one ticket;
C) electronically bundling the at least one image or the at least one link with the ticket information to generate a ticket bundle; and
D) providing the generated ticket bundle to at least one party associated with the at least one underground facility, to process the ticket bundle so as to facilitate the detection of the presence or the absence of the at least one underground facility.

34. The method of claim 33, further comprising electronically transmitting the ticket bundle to the at least one party associated with the at least one underground facility.

35. The method of claim 33, further comprising providing electronic access to the ticket bundle, to the at least one party associated with the at least one underground facility.

36. The method of claim 33, wherein the data includes a descriptor file comprising information identifying the ticket.

37. The method of claim 36, wherein the information identifying the ticket comprises a ticket number.

38. The method of claim 36, wherein the descriptor file comprises information identifying the at least one image corresponding to the ticket.

39. The method of claim 38, wherein the information identifying the at least one image corresponding to the ticket comprises an image name.

40. The method of claim 36, wherein the descriptor file comprises an XML file.

41. The method of claim 33, wherein the ticket bundle comprises a file including the at least one image and the ticket information.

42. The method of claim 33, wherein the ticket bundle comprises associated files including the at least one image and the ticket information.

43. The method of claim 33, wherein the ticket bundle comprises a file including the ticket information and information specifying or permitting access to the at least one image.

44. The method of claim 43, wherein the information specifying or permitting access to the at least one image comprises a link to the at least one image.

* * * * *

UNITED STATES PATENT AND TRADEMARK OFFICE
CERTIFICATE OF CORRECTION

Page 1 of 1

PATENT NO. : 8,296,308 B2
APPLICATION NO. : 12/475935
DATED : October 23, 2012
INVENTOR(S) : Steven Nielsen, Curtis Chambers and Jeffrey Farr It is certified that error appears in the above-identified patent and that said Letters Patent is hereby corrected as shown below:

Please replace column 30, line 51 with the following corrected version:

-- 17. The apparatus of claim 15 [[16]], wherein the processor pro- --

Please replace column 30, line 58 with the following corrected version:

-- 19. The apparatus of claim 18 [[15]], wherein the at least one --

Signed and Sealed this
First Day of January, 2013

David J. Kappos
*Director of the United States Patent and Trademark Office*